United States Patent
Thyagarajan

(10) Patent No.: US 12,339,295 B2
(45) Date of Patent: Jun. 24, 2025

(54) SYSTEMS, METHODS AND COMPUTER-READABLE MEDIUMS FOR DETECTING POSITION SENSOR FAULTS

(71) Applicant: Deere & Company, Moline, IL (US)

(72) Inventor: Lav Thyagarajan, West Fargo, ND (US)

(73) Assignee: Deere & Company, Moline, IL (US)

(*) Notice: Subject to any disclaimer, the term of this patent is extended or adjusted under 35 U.S.C. 154(b) by 1191 days.

(21) Appl. No.: 16/902,471

(22) Filed: Jun. 16, 2020

(65) Prior Publication Data
US 2021/0165011 A1 Jun. 3, 2021

Related U.S. Application Data

(60) Provisional application No. 62/942,888, filed on Dec. 3, 2019.

(51) Int. Cl.
| | |
|---|---|
| G01P 3/44 | (2006.01) |
| G01D 5/14 | (2006.01) |
| G05B 15/02 | (2006.01) |
| H02P 21/06 | (2016.01) |
| H02P 21/18 | (2016.01) |
| H02P 21/22 | (2016.01) |

(52) U.S. Cl.
CPC .................. *G01P 3/44* (2013.01); *G01D 5/14* (2013.01); *G05B 15/02* (2013.01); *H02P 21/06* (2013.01); *H02P 21/18* (2016.02); *H02P 21/22* (2016.02)

(58) Field of Classification Search
CPC . G01D 5/14; H02P 21/06; H02P 21/18; H02P 21/22; G01P 3/44; G05B 15/02
See application file for complete search history.

(56) References Cited

U.S. PATENT DOCUMENTS

| | | | |
|---|---|---|---|
| 10,284,127 B2 | 5/2019 | Aliprantis et al. | |
| 10,355,634 B1* | 7/2019 | Zhang | G01R 31/346 |
| 10,632,999 B2 | 4/2020 | Thyagarajan et al. | |
| 10,784,805 B1* | 9/2020 | Bojoi | H02P 21/22 |

(Continued)

FOREIGN PATENT DOCUMENTS

| | | |
|---|---|---|
| CN | 101043194 A | 9/2007 |
| CN | 103259485 A | 8/2013 |

OTHER PUBLICATIONS

European Search Report issued in counterpart application No. 20206519.9 dated May 11, 2021 (08 pages).

*Primary Examiner* — Neel D Shah
*Assistant Examiner* — Adam S Clarke
(74) *Attorney, Agent, or Firm* — Harness, Dickey & Pierce, P.L.C.

(57) ABSTRACT

At least one example embodiment discloses a system including a memory storing instructions and at least one controller configured to execute the instructions to cause the system to obtain a measured speed of an electric machine and a measured position of the electric machine based on output from a sensor, select an observer based on a speed value, obtain an estimated speed of the electric machine and an estimated position of the electric machine using the selected observer, determine a control output based on the measured speed and the measured position, the control output being the measured speed and the measured position or the estimated speed and the estimated position and control the electric machine using the control output.

26 Claims, 14 Drawing Sheets

(56) References Cited

U.S. PATENT DOCUMENTS

| | | | |
|---|---|---|---|
| 10,819,264 B1* | 10/2020 | Bojoi | H02P 21/18 |
| 2003/0015988 A1* | 1/2003 | Giuseppe | H02P 21/13 |
| | | | 318/727 |
| 2013/0289934 A1 | 10/2013 | Bazzi et al. | |
| 2014/0028132 A1* | 1/2014 | Jansen | H02P 9/02 |
| | | | 310/90 |
| 2014/0333241 A1* | 11/2014 | Zhao | H02P 27/08 |
| | | | 318/400.02 |
| 2015/0091548 A1* | 4/2015 | Scotson | G01D 5/243 |
| | | | 324/76.78 |
| 2015/0288306 A1 | 10/2015 | Wu et al. | |
| 2021/0139028 A1* | 5/2021 | Zhou | B60W 30/143 |

\* cited by examiner

SYSTEMS, METHODS AND COMPUTER-READABLE MEDIUMS FOR DETECTING POSITION SENSOR FAULTS

CROSS-REFERENCE TO RELATED APPLICATIONS

This application claims priority under 35 U.S.C. § 119(e) to U.S. Provisional Patent Application No. 62/942,888 filed in the United States Patent and Trademark Office on Dec. 3, 2019, the entire contents of which are herein incorporated by reference.

FIELD

Example embodiments are related to electric drive device systems and/or methods for controlling electric drive devices.

BACKGROUND

Electromechanical type of position sensors, e.g., resolvers, optical encoders, and hall-effect sensors, are used to obtain the rotor position and/or speed in motor drive systems. Sensors are often subject to failures in harsh environments, such as excessive ambient temperature, super high-speed operation, and other adverse or heavy load conditions.

As an alternative to sensors, sensorless drives including observers are used. An observer is embodied in a specific purpose computer, mainly a microcontroller or digital signal processor specifically programmed to execute the observer.

SUMMARY

Example embodiments disclose systems for detecting position sensor faults and sensorless position estimation.

At least one example embodiment discloses a system including a memory storing instructions and at least one controller configured to execute the instructions to cause the system to obtain a measured speed of an electric machine and a measured position of the electric machine based on output from a sensor, select an observer based on a speed value, obtain an estimated speed of the electric machine and an estimated position of the electric machine using the selected observer, determine a control output based on the measured speed and the measured position, the control output being the measured speed and the measured position or the estimated speed and the estimated position and control the electric machine using the control output.

BRIEF DESCRIPTION OF THE DRAWINGS

Example embodiments will be more clearly understood from the following detailed description taken in conjunction with the accompanying drawings. FIGS. 1A-10 represent non-limiting, example embodiments as described herein.

FIG. 1A illustrates a drive system for controlling an IPM machine according to an example embodiment;

FIG. 2 illustrates a position and speed processor according to at least one example embodiment;

FIG. 5 illustrates a method of controlling according to at least one example embodiment;

FIG. 7 illustrates a method of transitioning from a sensor based control to a sensorless based control and a method of selecting an observer model according to at least one example embodiment;

FIG. 8 illustrates a method of determining whether a sensor has recovered;

FIG. 9 illustrates an example embodiment of transitioning to a measured position and a measured speed as a control position and a control speed; and FIG. 10 illustrates a flow chart of dynamically adjusting proportional integral (PI) gains of a controller according to at least one example embodiment.

DETAILED DESCRIPTION

Figure 1A:
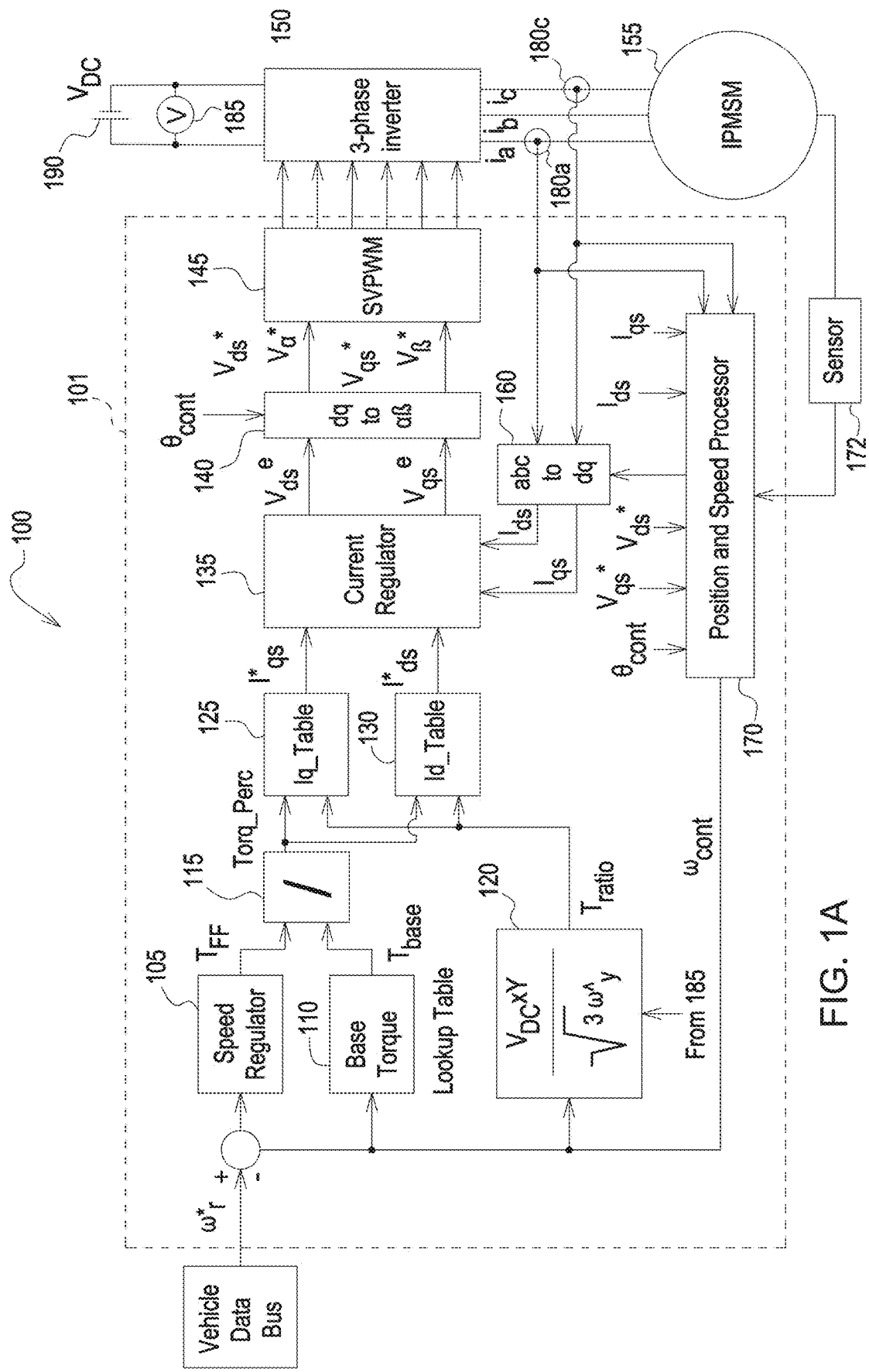

Example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

In controlling a motor, a pulse width modulation generator (e.g., space vector pulse width modulation) may generate gate signals for switching components in an inverter, which subsequently supplies current to the motor.

In a motor drive system, there are instances where the system uses rotor position information.

In some motor drive systems, a sensor based control performs over a speed regime as long as the sensor is functioning properly.

Observers estimate a rotor position and speed that are used in the event of position sensor failure (fault). Each type of observer is sensitive to machine parameters but have different estimation accuracies. Example embodiments exploit differences in observers to improve performance throughout operation of an electric machine (e.g., a motor) in the event of position sensor failure.

Example embodiments disclose a controller configured to detect a position sensor fault. The fault detection performed by the controller may include generation of a fault detection residual and a comparison of the residual to a set threshold. The generated fault detection residual may be sensitive to the actual fault of the sensor, insensitive to usual disturbance or noise and insensitive to parameter errors and/or non-linearities.

FIG. 1A illustrates a system including a controller configured to estimate a position of a rotor in a motor. In some example embodiments, the controller is configured to cause the system to obtain a measured speed of an electric machine and a measured position of the electric machine based on output from a sensor select an observer based on a speed value obtain an estimated speed of the electric machine and an estimated position of the electric machine using the selected observer, determine a control output based on the measured speed and the measured position, the control output being the measured speed and the measured position or the estimated speed and the estimated position, and control the electric machine using the control output.

In at least one example embodiment, the at least one controller is configured to execute the instructions to cause the system to select a voltage model observer or a current model observer based on the speed value.

In at least one example embodiment, the at least one controller is configured to execute the instructions to cause the system to select the current model observer if the speed value is below a threshold and determine the estimated position using the current model observer.

In at least one example embodiment, the at least one controller is configured to execute the instructions to cause the system to select the voltage model observer if the speed value is above a threshold and determine the estimated position using the voltage model observer.

In at least one example embodiment, the at least one controller is configured to execute the instructions to cause the system to determine the estimated position using the selected current model observer or the voltage model observer and determine the estimated speed using a Luenberger observer.

In at least one example embodiment, the at least one controller is configured to execute the instructions to cause the system to determine a first residual based on the measured speed, determine a second residual based on the measured position and determine a control output based on the first residual and the second residual.

In at least one example embodiment, the at least one controller is configured to execute the instructions to cause the system to determine a cumulative value based on a plurality of speed commands and update the first residual based on the speed commands.

In at least one example embodiment, the at least one controller is configured to execute the instructions to cause the system to determine if there is a change in the measured position and maintain the second residual if there is no change in the measured position.

In at least one example embodiment, the at least one controller is configured to execute the instructions to cause the system to determine whether a difference between a speed command and a filtered speed is greater than zero, determine whether the speed command is greater than zero, and increment the second residual if the difference between a speed command and a filtered speed is greater than zero and the speed command is greater than zero.

In accordance with an example embodiment, FIG. 1A illustrates a drive system 100 for controlling a machine such as a motor 155 (e.g., an interior permanent magnet synchronous motor (IPMSM)) or another alternating current machine.

It should be understood that the drive system 100 may include additional features that are not illustrated in FIG. 1A. For example, the drive system 100 may include a rotor magnet temperature estimation module, a current shaping module, and a terminal voltage feedback module. The features shown in FIG. 1A are illustrated for the convenience of describing the drive system 100 and it should be understood that the drive system 100 should not be limited to the features shown in FIG. 1A.

The drive system 100 includes electronic modules, software modules, or both. In an example embodiment, the drive system 100 includes an electronic data processing system 101 to support storing, processing or execution of software instructions of one or more software modules. The electronic data processing system 101 is indicated by the dashed lines in FIG. 1A, is shown in greater detail in FIG. 1B and may also be referred to as a controller.

The data processing system 101 is coupled to an inverter circuit 150. The inverter circuit 150 may be a three-phase inverter. The inverter circuit 150 includes a semiconductor drive circuit that drives or controls switching semiconductors (e.g., insulated gate bipolar transistors (IGBT) or other power transistors) to output control signals for the motor 155. In turn, the inverter circuit 150 is coupled to the motor 155. The motor 155 is associated with sensors 180a and 180c.

Throughout the specification, the sensors 180a and 180c are referred to as current transducers. However, it should be understood that the sensors 180a and 180c may be another type of current sensor.

The current transducers 180a and 180c and the motor 155 are coupled to the data processing system 101 to provide feedback data (e.g., current feedback data, such as phase current values Ia and Id), raw position signals, among other possible feedback data or signals, for example. While only two current transducers 180a and 180c are shown, it should be understood that the drive system 100 may implement three current transducers.

The data processing system 101 includes a speed regulator 105, a base torque lookup table (LUT) 110, a torque processor 115, a ratio calculator 120, a q-axis current (Iq) command LUT 125, a d-axis current (Id) command LUT 130, a current regulator 135, converters 140, 160, a pulse width generation module 145 and a position and speed processor 170.

The data processing system 101, including the speed regulator 105, the base torque lookup table (LUT) 110, the torque processor 115, the ratio calculator 120, the q-axis current (Iq) command LUT 125, the d-axis current (Id) command LUT 130, the current regulator 135, the converters 140, 160, the pulse width generation module 145 and the position and speed processor 170 may be implemented as hardware, such as a processor, firmware or hardware executing software as a special purpose machine. When the data processing system 101 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the data processing system 101. CPUs, DSPs, ASICs and FPGAs may generally be referred to as processors and/or microprocessors.

In the event that the data processing system 101 is a processor executing software, the processor is configured as special purpose machine to execute the software to perform the functions of the speed regulator 105, the base torque lookup table (LUT) 110, the torque processor 115, the ratio calculator 120, the q-axis current (Iq) command LUT 125, the d-axis current (Id) command LUT 130, the converters 140, 160, the pulse width generation module 145 and the position and speed processor 170. For example, a data processor 264 is specifically programmed to execute the speed regulator 105, the base torque lookup table (LUT) 110, the torque processor 115, the ratio calculator 120, the q-axis current (Iq) command LUT 125, the d-axis current (Id) command LUT 130, the current regulator 135, the converters 140, 160, the pulse width generation module 145 and the position and speed processor 170, as will be described in FIG. 1B.

In an example embodiment, a speed regulator 105 receives input data representing a difference between a control rotor speed cocont and a command rotor speed $\omega^*_r$ as input.

The command rotor speed $\omega^*_r$ may be input by a controller (shown as 266 in FIG. 1B) via a vehicle data bus 118. For example, if an operator wants the motor 155 to run at 5,000 RPM, the operator inputs 5,000 RPM into the controller and the vehicle data bus 118 inputs the command rotor speed $\omega^*_r$ to the data processing system 101. The speed regulator 105 converts the received input data into a feedforward torque TFF. The feedforward torque TFF may also be referred to as a torque command.

While the term command is used throughout the specification, it should be understood that command refers to a target value.

The base torque LUT 110 determines a base torque value Tbase based on the control rotor speed ωcont.

From the control rotor speed ωcont, base torque values are respectively associated with discrete speed points with a nominal dc bus voltage level. In other words, the two-dimensional base torque LUT 110 is established from a motor characterization procedure. During the IPM motor characterization procedure, each rotor shaft speed has a maximum output torque, which is defined as the base torque at that speed. Thus, the base torque may also be referred to as peak torque.

The base torque LUT 110 outputs the associated base torque value as the base torque value Tbase to the torque processor 115.

The torque processor 115 receives the base torque value Tbase and the feedforward torque TFF. The feedforward torque TFF may be in Nm.

The torque processor 115 is configured to determine an absolute value of the feedforward torque TFF. The torque processor 115 is configured to convert the absolute value of the feedforward torque TFF into a percentage Torq_Perc of the base torque value Tbase. The torque processor 115 outputs the percentage Torq_Perc to the q-axis current (Iq) command LUT 125 and the d-axis current (Id) command LUT 130.

In addition to sending the control rotor speed ωcont to the base torque LUT 110, the position and speed processor 170 sends the control rotor speed ωcont to the ratio calculator 120.

In addition to receiving the control rotor speed ωcont, the ratio calculator 120 is configured to receive the measured operating dc bus voltage value. The measured operating dc bus voltage value is provided by a voltage sensor 185 which measures the DC bus in the inverter circuit 150. The inverter circuit 150 is powered by a direct current (dc) voltage bus. The ratio calculator 120 adjusts the operating DC bus voltage VDC by the voltage sensor 185 to the detected operating rotor shaft speed ratio as follows:

$$Tratio=(VDC*Y)/(\sqrt{3}*\omega cont) \quad (1)$$

where Tratio is the adjusted detected operating DC bus voltage to the detected operating rotor shaft speed ratio and Y is a coefficient. For example, the coefficient Y may be 0.9. The ratio Tratio is output by the ratio calculator 120 to the d-q axis current command LUTs 125 and 130.

The q-axis current command (Iq) LUT 125 and the d-axis current (Id) command LUT 130 are configured to receive the ratio Tratio. The q-axis current command LUT 125 and the d-axis current command LUT 130 store q-axis and d-axis current commands, respectively, each of which is associated with a pair of ratio and torque percentage values. The development of the q-axis current command LUT 125 and the d-axis current command LUT 130 may be done using any known method.

The d-q axis current refers to the direct axis current and the quadrature axis current as applicable in the context of vector-controlled alternating current machines, such as the motor 155.

The d-axis current command LUT 130 is configured to output a d-axis current command $I^*_d$ that is associated with the received torque percentage Torq_Perc and the ratio Tratio. As shown in FIG. 1A, the d-axis current command $I^*_d$ is output to the current regulator 135.

The q-axis current command LUT 125 is configured to output a q-axis current command $I^*_q$ that is associated with the received torque percentage Torq_Perc and ratio Tratio.

It should be understood that $I^*_d$ and $I^*_q$ are current commands for a stator of the motor 155.

While the q-axis current command LUT 125 and d-axis current command LUT 130 are illustrated and described as LUTs, it should be understood that the q-axis current command LUT 125 and d-axis current command LUT 130 may be implemented as a set of equations that relate respective torque commands to corresponding direct and quadrature axes currents, or a set of rules (e.g., if-then rules) that relates respective torque commands to corresponding direct and quadrature axes currents.

As shown in FIG. 1A, the q-axis current command $I^*_q$ is output to the current regulator 135.

The current regulator 135 is capable of communicating with the pulse-width modulation (PWM) generation module 145 (e.g., space vector PWM generation module). The current regulator 135 receives respective d-q axis current commands (e.g., $I^*_d$ and $I^*_q$) and measured d-q axis currents (e.g., Ids and Iqs) for the stator and outputs synchronous d-q axis voltage commands $v_{ds}^e$ and $v_{qs}^e$ using any known method such as current feed forward compensation.

The converter 140 receives the synchronous d-q axis voltage commands $v_{ds}^e$ and $v_{qs}^e$ and performs an inverse Park transformation to generate α-β axis voltage commands $v^*_\alpha$ and $v^*_\beta$ (the α-β axis voltage commands $v^*_\alpha$ and $v^*_\beta$ may also be identified as stationary command values $v^*_{ds}$ and $v^*_{qs}$). While at least one example embodiment is described using the α-β axis, it should be understood that example embodiments may be implemented using the d-q axis or three phase representation of a control vector.

In an example embodiment, the PWM generation module 145 converts the α axis voltage and β axis voltage data (voltage commands $v^*_\alpha$ and $v^*_\beta$) from two phase data representations into three phase representations (e.g., three phase voltage representations, such as va*, vb* and vc*) for control of the motor 155, for example. Outputs of the PWM generation module 145 are coupled to the inverter circuit 150.

The inverter circuit 150 includes power electronics, such as switching semiconductors to generate, modify and control pulse-width modulated signals or other alternating current signals (e.g., pulse, square wave, sinusoidal, or other waveforms) applied to the motor 155. The PWM generation module 145 provides inputs to a driver stage within the inverter circuit 150. An output stage of the inverter circuit 150 provides a pulse-width modulated voltage waveform or other voltage signal for control of the motor 155. In an example embodiment, the inverter circuit 150 is powered by the direct current (dc) voltage bus voltage VDC.

The current transducers 180a, 180c measure two of three phase current data Ia and Ic, respectively, applied to the motor 155. It should be understood that an additional current transducer may also measure a third phase current data Ib.

The converter 160 may apply a Clarke transformation or other conversion equations (e.g., certain conversion equations that are suitable and are known to those of ordinary skill in the art) to convert the measured three-phase representations of current into two-phase representations of current based on the current data Ia and Ib from the current transducers 180a, 180c and a control rotor position ωcont from the position and speed processor 170.

The output of the converter 160 module (Ids, Iqs) is coupled to the current regulator 135 and the position and speed processor.

As should be understood, reference frame refers to a coordinate system used to represent and measure properties such as position (e.g., angular rotational position), velocity, torque, electrical parameters, and orientation of the rotor of the motor, the stator of the motor, or both. In a stationary reference frame, the position (e.g., angular rotational position), rotational velocity, torque, electrical parameters and orientation of the rotor, the stator, or both are observed from a stationary observer's point of view. A stationary reference frame may refer to the case where the reference frame is aligned with the stator of the motor, or where the d-axis and the q-axis do not rotate with the rotor. For the rotor or stator, a stationary reference frame is mutually exclusive to a rotating reference frame.

In a rotating reference frame, the instantaneous stator currents of a multi-phase motor can be expressed as a single complex stator current vector in a Cartesian coordinate system. If a Park transform or a similar transform is applied to the complex stator current vector, the reference frame has direct axis (d-axis) and quadrature axis (q-axis) components that rotate with rotor flux position (e.g., local maximum in magnetic field). For a motor with permanent magnets attached to the rotor the rotor flux position does not change with respect to the rotor, as opposed to where electromagnets are used in certain rotors.

Figure 2:
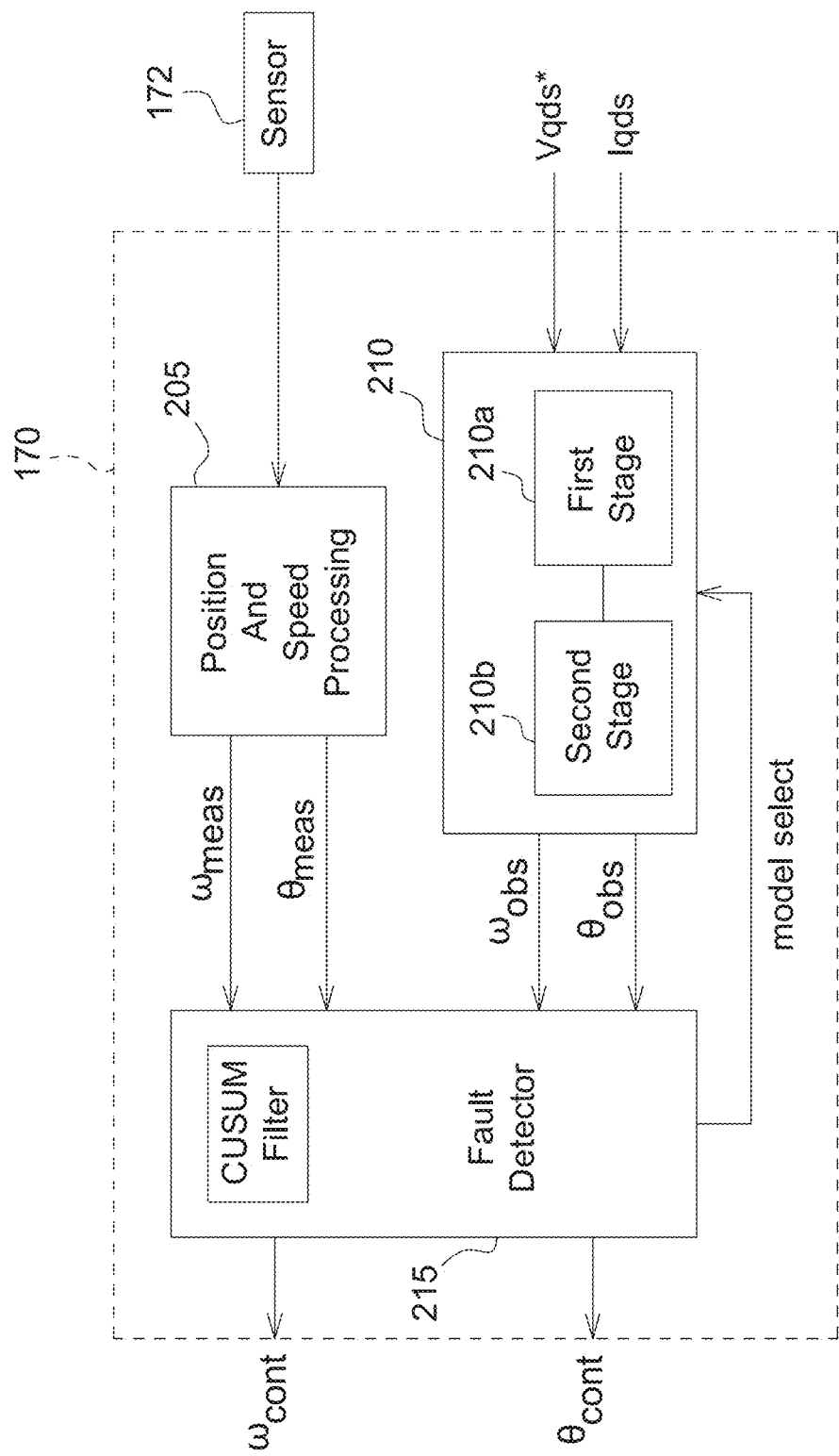

The position and speed processor 170 may apply a Park transformation or other conversion equations (e.g., certain conversion equations that are suitable and are known to those of ordinary skill in the art) to convert the measured three-phase representations of current into two-phase representations of current (measured currents, Iα, Iβ) based on the current data Ia and Ic from the current transducers 180a, 180c, using a converter 160 (shown in FIG. 2).

A position sensor 172 may generate data representative of a position of the rotor of the motor 155 and provide the data to the position and speed processor 170. The position sensor 172 may be any type of known position sensor including an encoder and a resolver.

The position and speed processor 170 receives the measured position θmeas, the measured currents Ia, Ic and the voltage commands $v^*_q$ and $v^*_d$ Based on the measured currents Ia, Ic and the voltage commands $v^*_q$ and $v^*_d$, the position and speed processor 170 is configured to output the control position θcont to the converter 160, as will be described in greater detail in FIG. 2.

The position and speed processor 170 may also convert the estimated rotor position $\hat{\theta}_{re}$ into the estimated rotor speed $\hat{\omega}_r$.

Figure 1B:
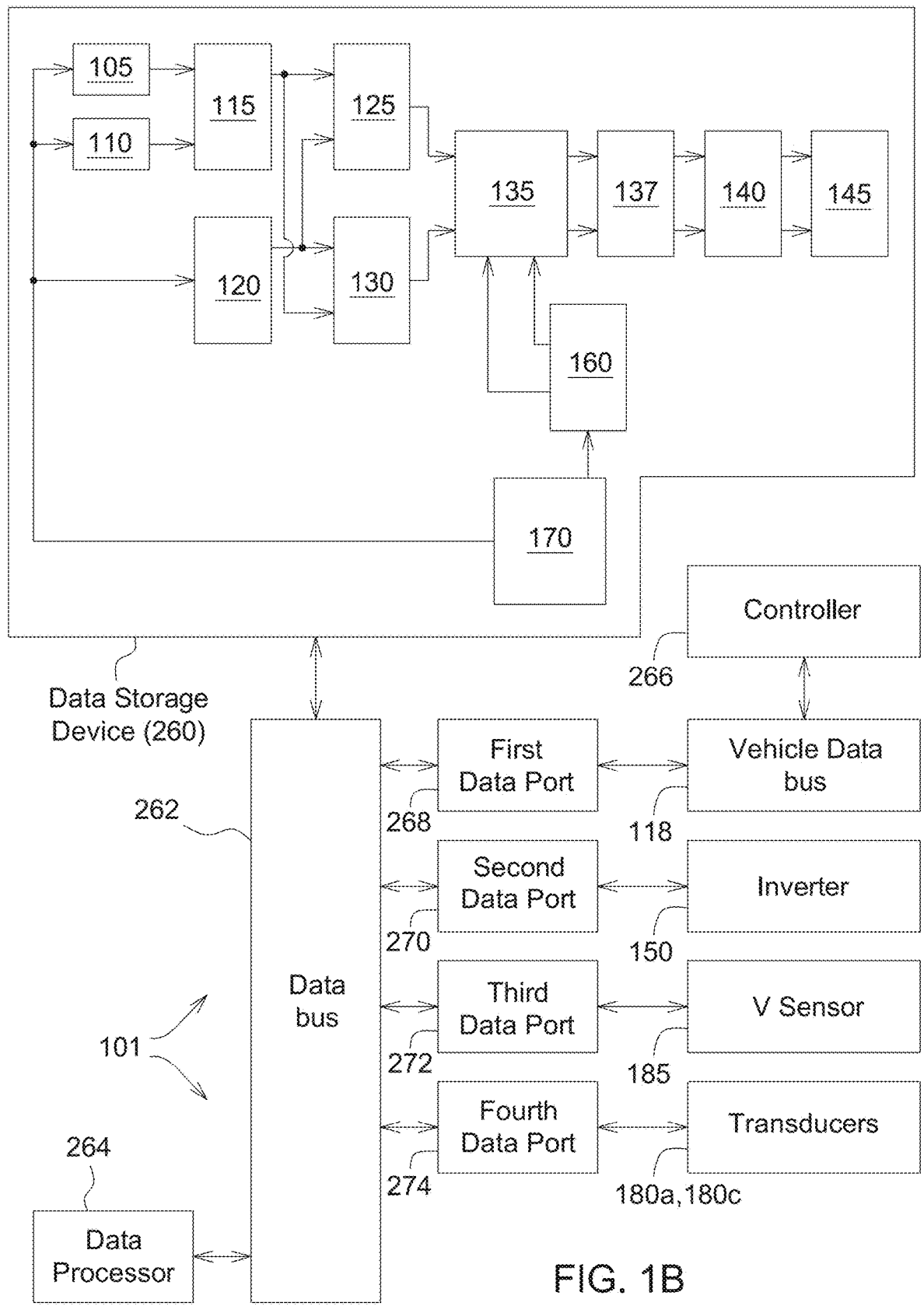
FIG. 1B illustrates a data processing system of the drive system of FIG. 1A according to an example embodiment.

In FIG. 1B, the electronic data processing system 101 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like. The storage device 260 may be a read only memory (ROM), random access memory (RAM), magnetic RAM, core memory, magnetic disk storage medium, optical storage medium, flash memory device and/or other tangible machine readable medium for storing information.

Moreover, in one example embodiment the data storage device 260 may store the algorithms implemented in the speed regulator 105, the base torque lookup table (LUT) 110, the torque processor 115, the ratio calculator 120, the q-axis current (Iq) command LUT 125, the d-axis current (Id) command LUT 130, the current regulator 135, the converter 140, pulse width generation module 145, the converter 160 and the position and speed processor 170 to be executed by the data processor 264. The data processor 264 may access the data storage device 260 and execute in the speed regulator 105, the base torque lookup table (LUT) 110, the torque processor 115, the ratio calculator 120, the q-axis current (Iq) command LUT 125, the d-axis current (Id) command LUT 130, the current regulator 135, the converter 140, pulse width generation module 145, the converter 160 and the position and speed processor 170 via the data bus 262.

As shown in FIG. 1B, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 1B, the first data port 268 is coupled to the vehicle data bus 118. In turn, the vehicle data bus 118 is coupled to a controller 266. In one configuration, the second data port 270 may be coupled to the inverter circuit 150; the third data port 272 may be coupled to the voltage sensor 185; and the fourth data port 274 may be coupled to the transducers 180a and 180c.

In an example embodiment of the data processing system 101, the speed regulator 105 is associated with or supported by the first data port 268 of the electronic data processing system 101. The first data port 268 may be coupled to a vehicle data bus 118, such as a controller area network (CAN) data bus. The vehicle data bus 118 may provide data bus messages with torque commands to the speed regulator 105 via the first data port 268. The operator of a vehicle may generate the torque commands via a user interface, such as a throttle, a pedal, the controller 266, or other control device.

FIG. 2 illustrates a position and speed processor according to at least one example embodiment. As shown in FIG. 2, the position and speed processor 170 includes a position and speed processing unit 205, a position and speed observer 210 and a fault detector 215. The position and speed processing unit 205, the position and speed observer 210 and the fault detector 215 be implemented as hardware, such as a processor, firmware or hardware executing software as a special purpose machine.

The position and speed processing unit 205 receives the output of the position sensor 172 and generates a measured speed ωmeas and a measured rotor position ° meas. In at least one example embodiment, the position sensor 172 is an incremental encoder with an index that produces A/B digital pulses. The A/B are digital pulses that provide direction and a number of pulses (e.g., 512 pulses each) per rotor revolution. Once per mechanical revolution the index line (Z)

pulses to provide an absolute position. The position and speed processing unit 205 accounts for sensing delays, converts the A/B/Z measurements to the corresponding position in radians or degrees or other engineering units.

In at least one example embodiment, the position and speed processing unit 205 may determine the measured speed ωmeas by determining the measured position of the rotor θmeas as:

$$\theta meas = \text{IndexAngle}_Z + (CW_{EdgeCount} - CCW_{EdgeCount}) * \frac{2\pi \text{ rad}}{1024 \text{ edges}}$$

where CWEdgeCount is the edge count for the clockwise direction and CCWEdgeCount is the edge count for the counterclockwise direction and IndexAngleZ is the measurement of the index pulse Z.

The position and speed processing unit 205 may determine the measured speed ωmeas as:

$$\omega meas = \frac{\theta_{meas2} - \theta_{meas1}}{\Delta t}$$

where $\theta_{meas1}$ and $\theta_{meas2}$ are two position estimates taken sequentially ($\theta_{meas1}$ preceding $\theta_{meas2}$) with a change in time $\Delta t$ between estimates.

In some example embodiments, a sensorless position estimator may be used instead of the position sensor 172.

The fault detector 215 may include a filter such as a cumulative sum (CUSUM) filter 216. The CUSUM filter 216 may filter a first residual. The first residual may be generated by the fault detector 215 and is an error between a filtered speed (an observer speed) gobs and the command rotor speed ω*$_r$. A second residual may be generated by the fault detector 215 using a measured position. The first and second residuals will be discussed in further detail below.

The position and speed observer 210 receives the measured d-q axis currents in the stationary frame (e.g., Ids and Iqs) and measured d-q axis voltages in the stationary frame (Vds and Vqs) for the stator (or α-β axis voltage commands v*$_\alpha$ and v*$_\beta$) and generates an observer speed ωobs and an observer position θobs based on the measured d-q axis currents (e.g., Ids and Iqs) and measured d-q axis voltages (Vd and Vq).

The position and speed observer 210 includes a first stage 210a and a second stage 210b. The first stage 210a uses a current model or voltage model based on a model select signal from the fault detector 215. More specifically, for estimated speeds from zero to a desired speed (e.g., a low speed threshold), the position and speed observer 210 uses a current model to determine the estimated position θobs and an estimated speed $\hat{\omega}_r$. For estimated speeds above the desired speed, the position and speed observer 210 uses a voltage model determine the estimated position θobs and the estimated speed $\hat{\omega}_r$.

The desired speed may be a threshold set by a user based on empirical data and may vary depending on implementation. The second stage 210b receives the estimated speed $\hat{\omega}_r$, the first stage 210a and determines the observer speed gobs of the rotor based on the estimated speed $\hat{\omega}_r$.

Figure 3A:
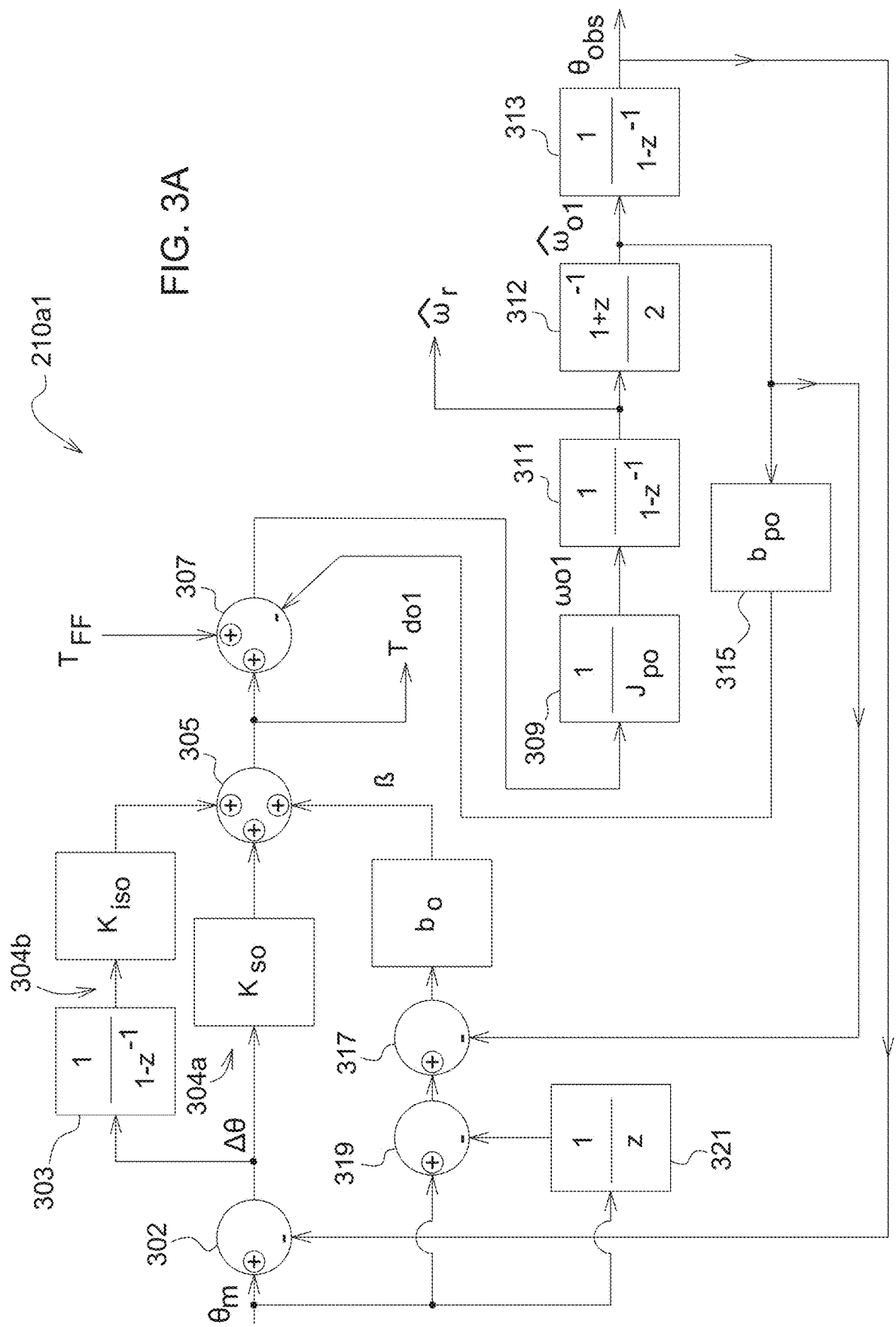
FIGS. 3A-3C illustrate example embodiments of a first stage of a position and speed observer shown in FIG. 2.
Figure 3B:
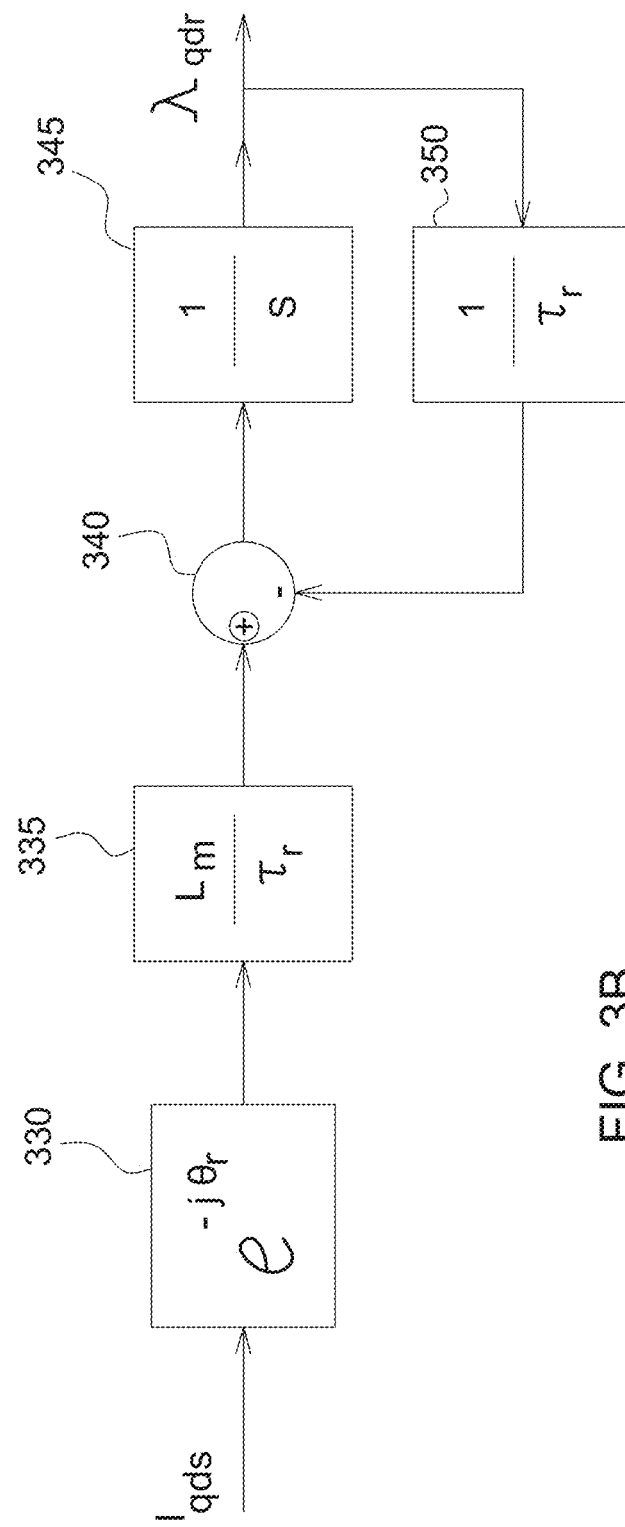
Figure 3C:
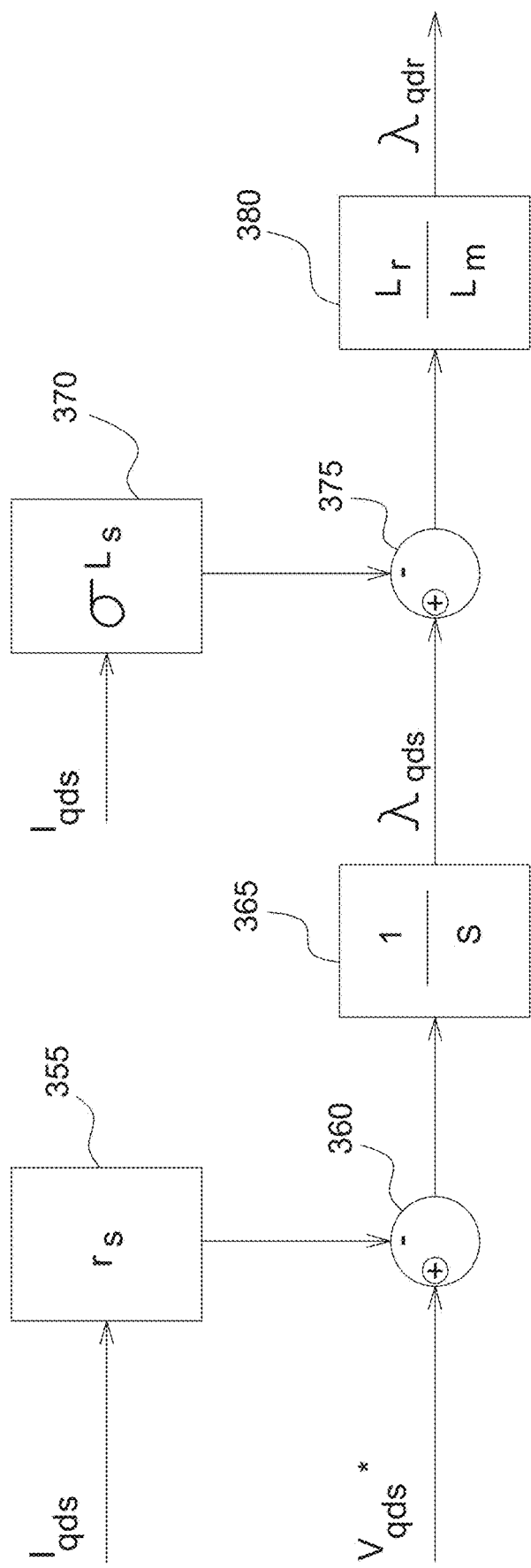

FIGS. 3A-3B illustrate example embodiments of the first stage 210a. More specifically, FIG. 3A illustrates a mechanical model of the first stage 210a. FIG. 3B illustrates a current model of the first stage according to at least one example embodiment. FIG. 3C illustrates a voltage model of the first stage according to at least one example embodiment.

FIG. 3A illustrates a mechanical model 210a1 of the first stage 210a according to at least one example embodiment. The mechanical model 210a1 may be implemented in the digital domain.

As shown in FIG. 3A, the first stage 210a1 receives a mechanical position θm.

The first stage 210a1 determines a difference Δθ from the mechanical position θm and the current observer position θobs at a subtractor 302. The difference Δθ is applied to an observer gain Kso on a first path 304a and is applied to a first z-transform 303 (1/(1−z−1)) and then another observer gain Kiso on a second path 304b. The product of the difference Δθ and the gain Kso from the first path 304a is summed with the product of the difference Δθ, 1/(1−z−1) and the gain Kiso from the second path 304b and a value B at an adder 305. The output of the adder 305 is a shaft torque disturbance value Tdo1.

The torque value Tdo1 is summed with a feed-forward torque TFF at an adder 307. The adder 307 also subtracts a product of an average speed estimate from the observer $\widehat{\omega_{o1}}$ and a physical estimation of damping bpo (po refers to physical damping of an observer) from the shaft torque disturbance value Tdo1 and the feed-forward torque TFF to generate an output of the adder 307.

The output of the adder 307 is multiplied by 1/Jpo at 309 to generate a derivative of the speed estimate from the observer ω*$_{o1}$, where Jpo is an estimate of a true inertia (motor inertia plus load inertia).

The derivate of the speed estimate from the observer ω*$_{o1}$ then goes through a second z-transform 311 (1/(1−z−1)), a third z-transform 312 ((1+z−1)/2) and then a fourth z-transform 313 (1/(1−z−1)). More specifically, the output of the second z-transform 311 is an estimated rotor speed $\widehat{\omega_r}$ and is input to the third z-transform 312 as well as the second stage 210b1. The output of the third z-transform 312 average speed estimate from the observer $\widehat{\omega_{o1}}$ and is input to the fourth z-transform 313. Using the output of the third z-transform 312 the fourth z-transform 313 generates the observer position θobs. The observer position θobs is feedback to the subtractor 302.

The output of the third z-transform 312 (the speed estimate from the observer $\widehat{\omega_{o1}}$) is multiplied by an observer gain bpo at 315. The product of the output of the third z-transform 312 and physical estimation of damping bpo is fed to the adder 307.

The speed estimate from the observer $\widehat{\omega_{o1}}$ is also fed based to a subtractor 317.

The mechanical position θm is also input to a subtractor 319 and a fifth z-transform 321 (1/z). The subtractor 319 determines a difference between the mechanical position θm and the 1/z transform of the mechanical position θm. The difference outputted by the subtractor 319 is input to the subtractor 317. The subtractor 317 determines a difference between the output of the subtractor 319 and the speed estimate from the observer $\widehat{\omega_{o1}}$ and outputs the difference where it is multiplied by a gain bo of the observer to generate the value B.

FIG. 3B illustrates a current model of the first stage according to at least one example embodiment. As shown in FIG. 3B, the current model illustrated is for an induction type machine.

At 330, the current Iqds is multiplied by e−jθr and then multiplied by (Lm/τr) at 335 where Lm is a magnetizing inductance, Tr is a rotor time constant (ratio of rotor inductance and rotor resistance), and λqdr is a flux linkage. The output at 335 is input to a subtractor 340. A Laplace transform 345 (1/s) is applied to the output of the subtractor 340. The output of the Laplace transform 345 is a flux linkage λqdr in the rotor reference frame (subscript r refers to rotor reference frame). The flux linkage λqdr is feedback to a 1/τr transformation at 350. The output of the transformation 350 is input to the subtractor 340.

Thus, the flux linkage λqdr may be determined as:

$$\lambda_{qdr} = \frac{L_m I_{qds}}{s\tau_{r+1}}$$

A rotor position θr for an induction machine is the mechanical position. The arc tangent of the rotor flux λqdr estimated by current and voltage models are a synchronous position θe. Subtracting a slip position θslip from θe generates θr, which is the same as the mechanical position θm. To derive the slip position θslip, a slip speed ωslip is integrated. The slip speed ωslip, is an estimated quantity in the controller 101 where $$\omega slip = (1/\tau r)*(Iqs/Ids)$$

FIG. 3C illustrates a voltage model of the first stage according to at least one example embodiment.

As shown in FIG. 3C, the current Iqds is multiplied by a stator resistance rs at 355. A subtractor 360 determines a difference between the voltage Vqds command and the product of the current Iqds and the stator resistance rs. A Laplace transform 365 is applied to the difference determined by the subtractor 360 to generate a stationary flux linkage λqds. The current Iqds is multiplied by a total stator inductance Ls ((Lm+Lls) where Lls is the stator leakage inductance) and a coupling factor σ ((1−Lm2)/(Ls*Lr)) at 370. A subtractor 375 determines a difference between the stationary flux linkage λqds and the product of the current Iqds, the total stator inductance Ls and the coupling factor σ. The difference generated by the subtractor 375 is multiplied by a ratio of the total rotor inductance Lr to the total magnetic inductance Lm at 380 to generate the flux linkage λqdr. Thus, the flux linkage λqdr may be determined as:

$$\lambda_{qdr} = \frac{L_r}{L_m}\lambda_{qds} - \frac{L_s L_r - L_m^2}{L_m} I_{qds}$$

Figure 4A:
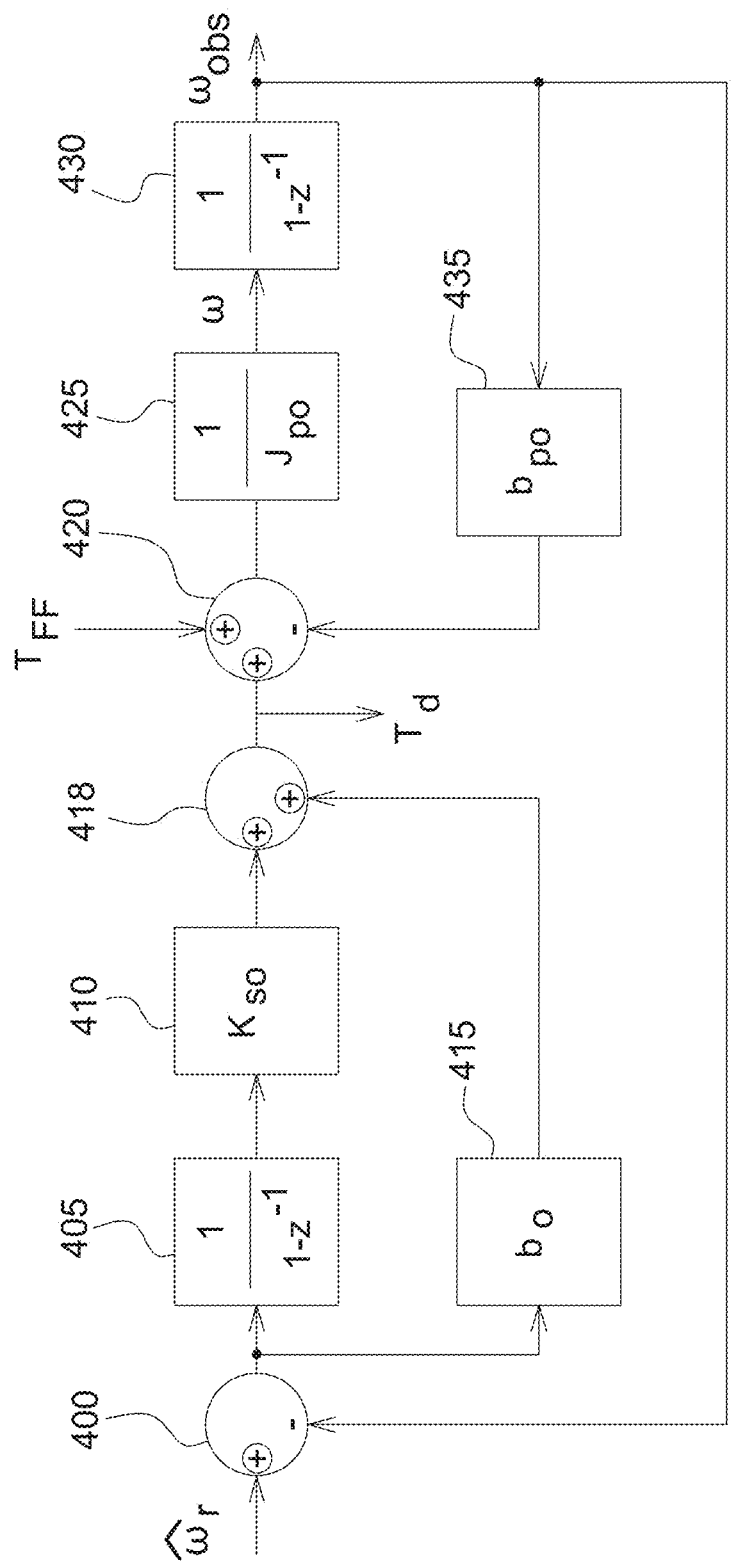
FIGS. 4A-4B illustrate example embodiments of a second stage of the position and speed observer shown in FIG. 2.
Figure 4B:
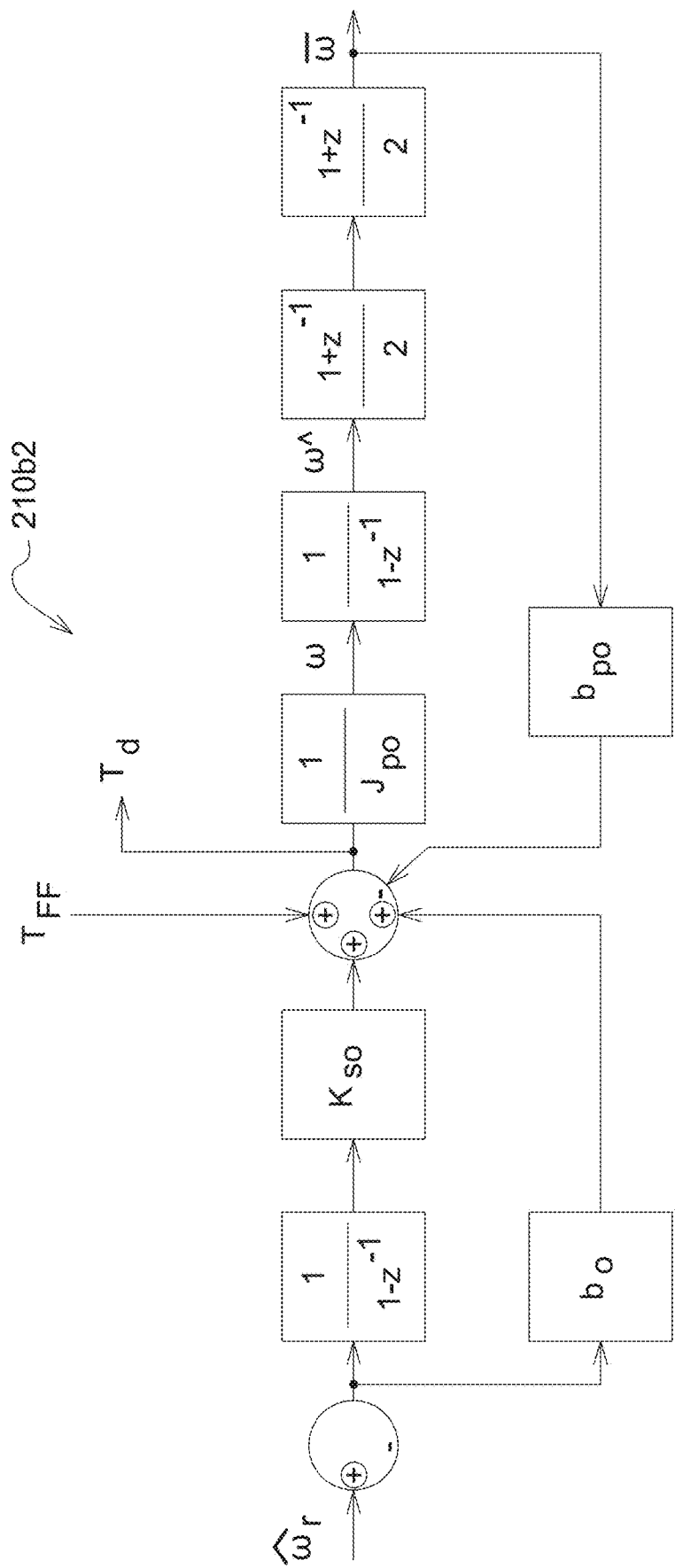

FIGS. 4A-4B illustrate example embodiments of a second stage of the position and speed observer shown in FIG. 2.

As shown in FIG. 4A, the second stage may be a Luenberger observer 210b1. The Luenberger observer 210b1 may be used to filter the estimated rotor speed $\widehat{\omega_r}$ from the first stage 210a1 with zero or reduced lag. The Luenberger observer 210b1 is implemented in the digital domain. The Luenberger observer 210b1 represents the mechanical model of the system.

A subtractor 400 determines a difference between the estimated rotor speed $\widehat{\omega_r}$ and a current observed speed gobs. A first z-transform 405 (1/(1−z−1)) is applied to the difference determined by the subtractor and the difference determined by the subtractor is multiplied by bo at 415. The result of the first z-transform is then multiplied by the gain Kso at 410. The product of 410 and the product of 415 are added by an adder 418. The sum of the product of 410 and the product of 415 produced by the adder 418 is a disturbance torque value Td. The disturbance torque value Td is added with the feed forward torque TFF at an adder 420. The adder 420 also subtracts a product of the current observed speed gobs and the physical estimation of damping bpo from the sum of the sum of the product of 410, the product of 415 and the feed forward torque TFF.

The result of the adder 420 is multiplied by (1/Jpo) at 425 to generate a speed derivative ω̇. A second z-transform 430 (1/(1−z−1)) is applied to the speed derivative ω̇ to generate a new observed speed ωobs. The new observed speed gobs is feedback to be multiplied by bpo at 435 and then to the adder 420.

As shown in FIG. 4B, the second stage may be a Luenberger observer 210b2.

The Luenberger observer 210b2 may be used to filter the estimated rotor speed $\widehat{\omega_r}$ from the first stage 210a1 with zero or reduced lag. The Luenberger observer 210b2 is implemented in the digital domain. The Luenberger observer 210b2 represents the mechanical model of the system.

Figure 5:
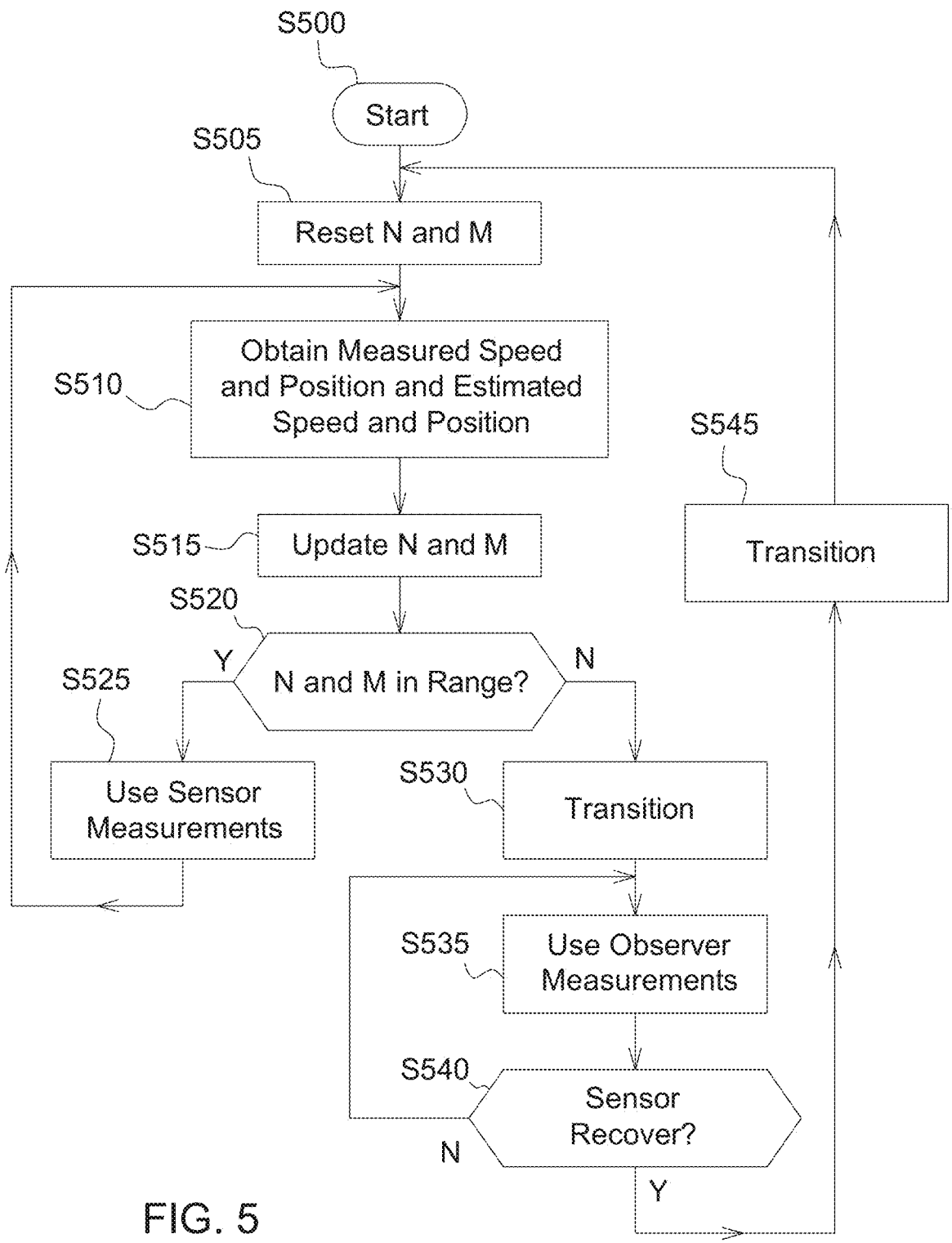

FIG. 5 illustrates a method of controlling according to at least one example embodiment. The method includes determining a position sensor fault and determining a mode of providing a position value and a speed value.

In at least one example embodiment, the method includes obtaining a measured speed of an electric machine and a measured position of the electric machine based on output from a sensor, selecting an observer based on a speed value, obtaining an estimated speed of the electric machine and an estimated position of the electric machine using the selected observer, determining a control output based on the measured speed and the measured position, the control output being the measured speed and the measured position or the estimated speed and the estimated position and controlling the electric machine using the control output.

In at least one example embodiment, the selecting selects a voltage model observer or a current model observer based on the speed value.

In at least one example embodiment, the selecting includes selecting the current model observer if the speed value is below a threshold and determining the estimated position using the current model observer.

In at least one example embodiment, the selecting includes selecting the voltage model observer if the speed value is above a threshold and determining the estimated position using the voltage model observer.

In at least one example embodiment, the selecting includes determining the estimated position using the selected current model observer or the voltage model observer and determining the estimated speed using a Luenberger observer.

In at least one example embodiment, the determining includes determining a first residual based on the measured speed determining a second residual based on the measured position and determining a control output based on the first residual and the second residual.

In at least one example embodiment, the determining the first residual includes determining a cumulative value based on a plurality of speed commands and updating the first residual based on the speed commands.

In at least one example embodiment, the determining the second residual includes determining if there is a change in the measured position and maintaining the second residual if there is no change in the measured position.

In at least one example embodiment, the determining the second residual includes determining whether a difference between a speed command and a filtered speed is greater than zero determining whether the speed command is greater than zero and incrementing the second residual if the difference between a speed command and a filtered speed is greater than zero and the speed command is greater than zero.

Referring to FIG. 5, the method may be performed by the fault detector 215.

At S500, the fault detector 215 starts performing the method. At S505, the fault detector 215 resets a first residual N and a second residual M. In some example embodiments, the first residual N and the second residual M are both set to zero.

At S510, the fault detector 215 obtains the measured speed ωmeas and position θmeas from the position and speed processing unit 205 and obtains the observer speed gobs and observer position bobs from the position and speed observer 210.

At S515, the fault detector 215 updates the first residual N and the second residual M based on the measured speed ωmeas and position θmeas.

Figure 6C:
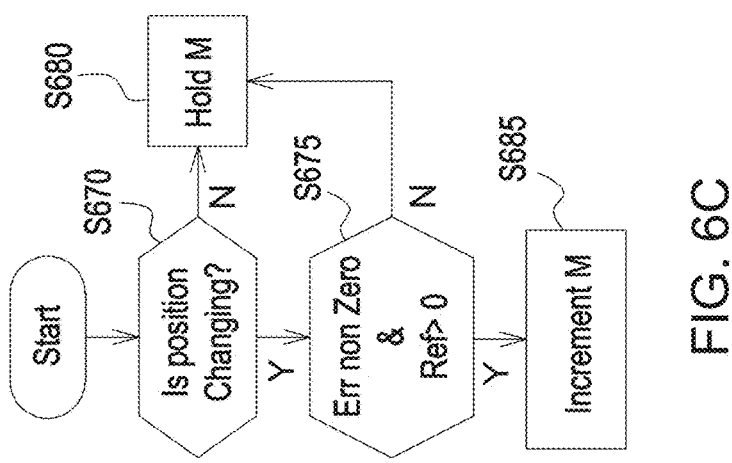
FIG. 6C illustrates a method of updating the second residual M according to at least one example embodiment.
Figure 6B:
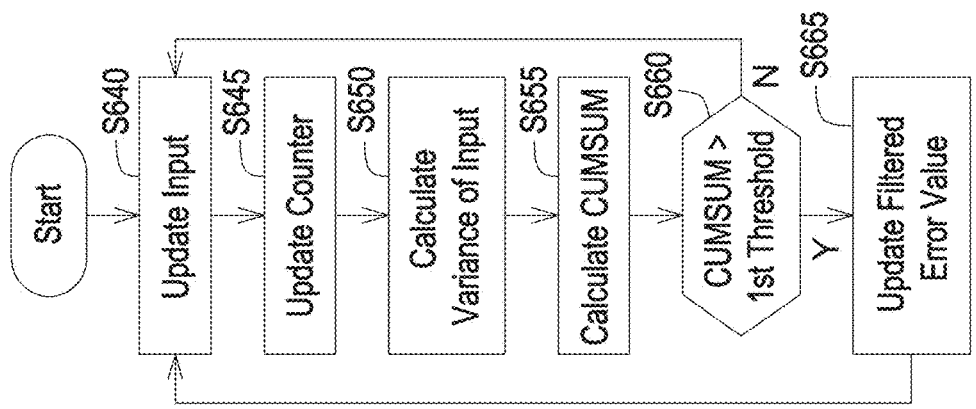
FIG. 6B illustrates a method of filtering according to at least one example embodiment.
Figure 6A:
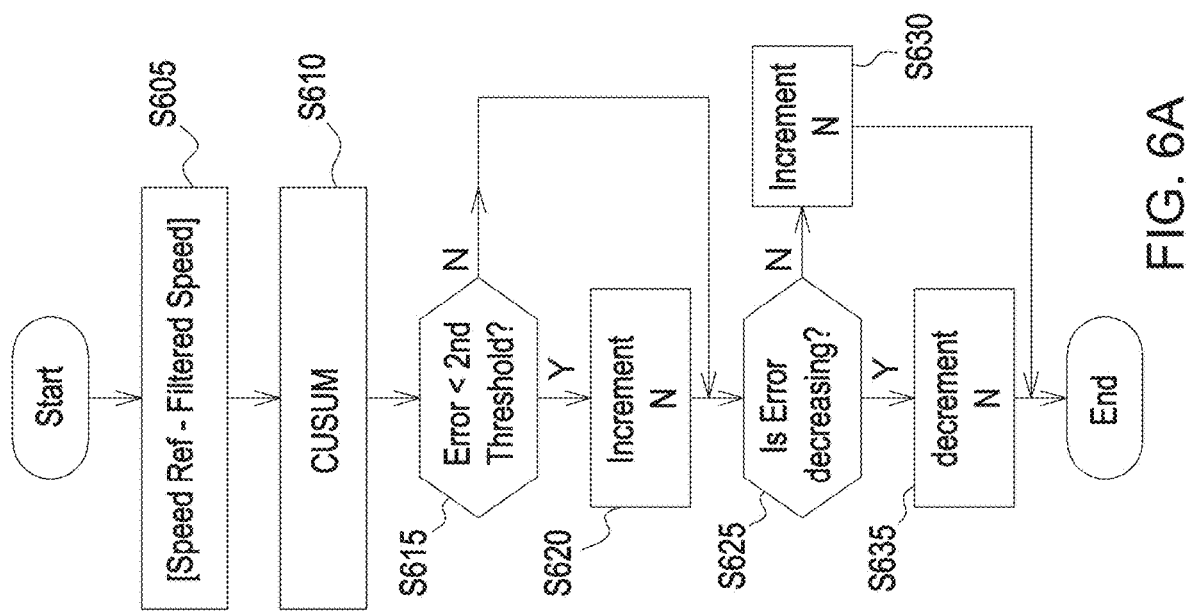
FIG. 6A illustrates a method of updating the first residual N according to at least one example embodiment.

FIG. 6A illustrates a method of updating the first residual N according to at least one example embodiment.

At S605, the fault detector 215 determines a difference between a speed command (i.e., a command rotor speed ω*$_r$) and a filtered speed. At S610, the CUSUM filter 216 filters the difference between the speed command and a current filtered speed. The filtering performed by the CUSUM filter 216 is shown in more detail in FIG. 6B. The generation of the filtered speed is also described in FIG. 6B.

At S640, the CUSUM filter updates the input by including the difference determined at S605.

A first order filter may be used to smooth noisy signals. A first order filter in the discrete domain may be:

$$X_{Filt[k]} = G*X_{Filt[k-1]} + (1-G)*X_{[k]}$$

where G is a filter gain, $X_{[k]}$ is the input at the 'kth' sample and $X_{Filt[k-1]}$ is a filtered value (i.e., filtered speed).

To increase the filtering, the filter gain G can be increased. However, increasing G may result in more lag, as it will cause a lag in the residual generation, which in turn causes lag in a switchover to a sensorless mode for position and speed estimation.

The CUSUM filter 216 keeps a mean unchanged until there is sufficient statistical evidence that there has been a real change in the signal that is being filtered (e.g., the difference between the speed command and the filtered speed).

At S645, the CUSUM filter 216 updates a counter value k.

At S650, the CUSUM filter 216 determines a variance of measured rotor speeds of a number of samples.

At S655, the CUSUM filter 216 may generate a cumulative value CUMSUM as follows:

$$CUMSUM = \sum \frac{(x_k - x_{filt(k-1)})}{\widehat{\sigma_x}}$$

where $x_k$ is the difference between the command rotor speed and the filtered speed at a kth sample, $x_{filt(k-1)}$ is the previous value of filtered output and $\widehat{\sigma_x}$ is the variance.

At S660, the CUSUM filter 660 compares the CUMSUM generated at S655 with a first threshold value. The first threshold value may be based on empirical data and/or set by a user. The first threshold value may be in terms of sigma, e.g., a value of 2 sigma specifies a 95% confidence and 3 sigma specifies 99.7% confidence. If the CUMSUM is greater than the first threshold, the CUSUM filter 216 updates a filtered error value at S665.

Referring back to FIG. 6A, the fault detector 215 determines whether the filtered error value determined at S665 is less than a second threshold value. The second threshold value may be based on empirical data and/or set by a user. The second threshold value may be application specific. If the error is less than the threshold Th-H, the fault detector 215 increments the first residual N and proceeds to S625. In some example embodiments, the fault detector 215 increments the first residual N by two. In other example embodiments, the amount of incrementing is application specific and set to a desired value based on empirical data.

If the error is greater than or equal to the threshold Th-H, the first residual is maintained and the method proceeds to S625.

At S625, the fault detector determines whether the error is decreasing. If the fault detector 215 determines the error is decreasing, the fault detector decrements the first residual N. If the fault detector 215 determines the error is not decreasing, the fault detector 215 increases the first residual at S630.

FIG. 6C illustrates a method of updating the second residual M according to at least one example embodiment.

As shown in FIG. 6C, the fault detector 215 determines whether the measured position (e.g., θmeas) is changing at S670. If the fault detector 215 determines that the measured position is changing at S670, the fault detector 215 determines whether the difference between the speed command and the filtered speed (determined at S605) and the speed command are greater than zero at S675. If the fault detector 215 determines that the difference between the speed command and the filtered speed (determined at S605) and the speed command are greater than zero, the fault detector 215 increments the second residual M at S685. In some example embodiments, the second residual is incremented by one. If the fault detector 215 determines that the position is not changing or that at least one of the difference between the speed command and the filtered speed (determined at S605) and the speed command are not greater than zero, the fault detector 215 maintains the second residual M at S680.

Referring back to FIG. 5, the fault detector 215 determines whether the first residual N is more than a third threshold value and whether the second residual M is more than a fourth threshold value.

Once a fault is detected and sensor failure is identified, the fault detector 215 switches the control to the sensorless control. Position and speed synchronizing scheme is used to enable a jitter free and/or reduced jitter transfer to the sensorless control.

If the first residual N is not more than the third threshold value and the second residual M is not greater than the fourth threshold value, the fault detector 215 continues to use a sensor based control mode at S525. More specifically, the position and speed processor 170 continues to output the measured position θmeas as the control position θcont and the measured speed ωmeas as the control speed ωcont.

Moreover, the fault detector 215 determines a voltage position offset θoffset_v between the control position θcont and the observer position θobs_v using the voltage model and a current position offset θoffset_i between the control position θcont and the observer position θobs_i using the current.

If the first residual N is more than the third threshold value and/or the second residual M is less than the second threshold value, the fault detector 215 performs a transition from a sensor based control mode to a sensorless based control mode at S530. More specifically, the position and speed processor 170 uses the observer position θobs as the control position θcont and the observer speed ωobs as the control speed ωcont.

The third and fourth threshold values may be set by a user based on empirical data and/or inertia and acceleration/declaration requirements.

Figure 7:
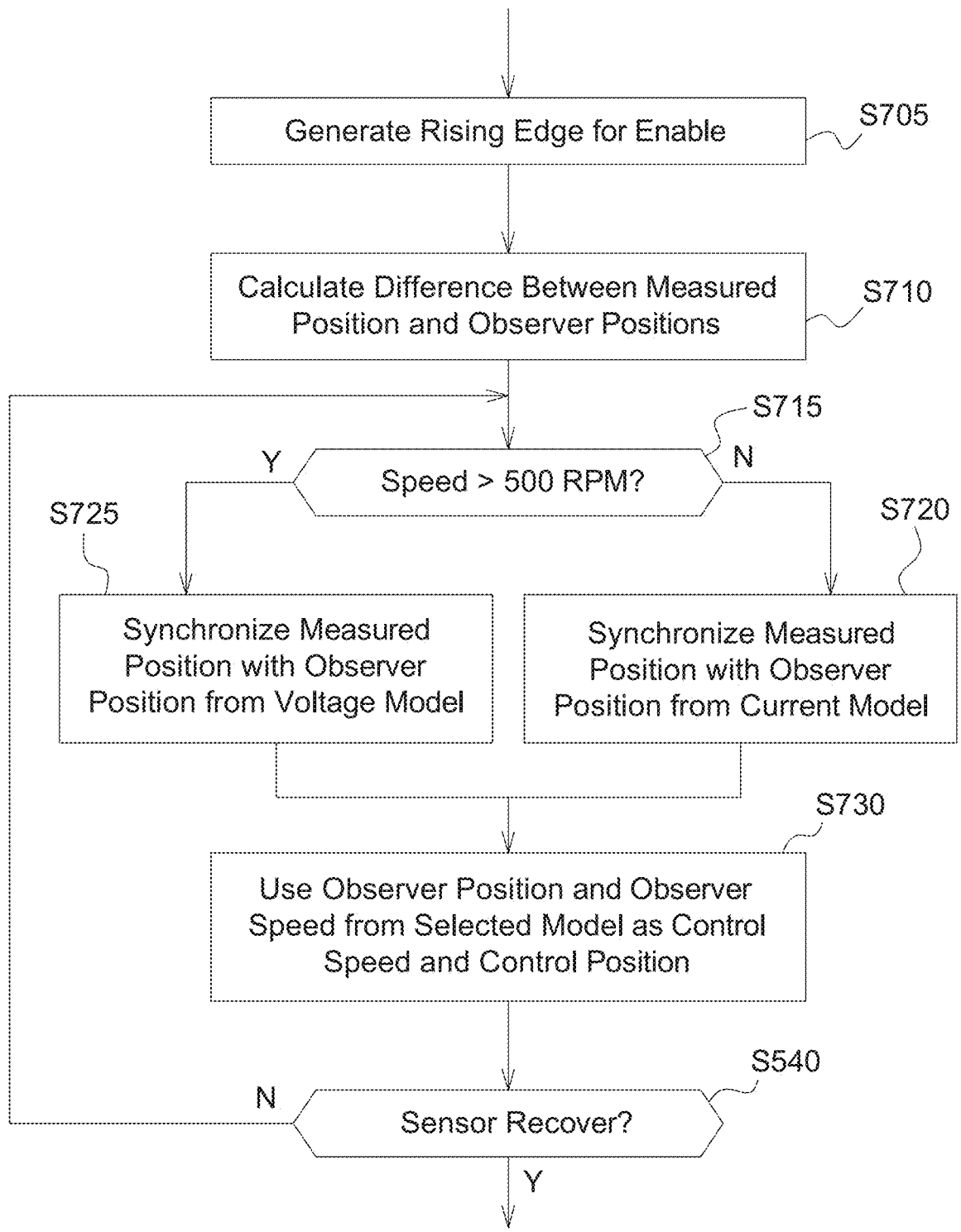

FIG. 7 illustrates a method of transitioning from a sensor based control to a sensorless based control and using the sensorless measurements according to at least one example embodiment. More specifically, FIG. 7 illustrates an example embodiment of S530, S535 and S540.

At S705, the fault detector 215 generates a rising edge for an enable signal when the fault detector 215 determines the first residual N is more than the third threshold value and/or the second residual M is less than the second threshold value. Upon generation of the rising edge, the fault detector determines a voltage position offset θoffset_v between the control position θcont and an observer position θobs_v using the voltage model and a current position offset θoffset_i between the control position θcont and an observer position θobs_i using the current model at S710. Because example embodiments utilize a first residual N and a second residual M, example embodiments enable switchover before an appreciable degradation of the measured position °meas.

At S715, the fault detector selects an observer.

If the fault detector 215 determines whether the control speed ωcont is greater than a speed threshold (e.g., 500 revolutions per minute (RPM)). If the fault detector 215 determines that the control speed ωcont is equal to or less than the speed threshold, the fault detector 215 sets a flag VorI to 1, and selects the current model, indicating that the current model should be used in the first stage 210a.

At S720, the fault detector 215 may synchronize the observer position θobs_i with the measured position °meas. More specifically, the fault detector 215 uses a monostable circuit (e.g., having a 50 μs sample time) to adjust the observer position θobs_i by the current position offset θoffset_i to match the measured position θmeas.

The monostable circuit is a trigger generator. The rising edge of the enable signal triggers the rising edge monostable which in turn enables a determination of the current position offset θoffset_i. The current position offset θoffset_i is added to the observed position θobs_i to synchronize it the measured position θmeas.

As will be described below, the same concept may be applied for sensor recovery. In this case, a falling edge for the enable signal is generated causing the falling edge monostable to trigger.

If the fault detector 215 determines that the control speed ωcont is greater than the speed threshold, the fault detector 215 sets a flag VorI to 0 and selects the voltage model at S715, indicating that the voltage model should be used in the first stage 210a.

At S725, the fault detector 215 may synchronize the observer position θobs_v from the voltage model with the measured position θmeas. More specifically, the fault detector 215 uses the monostable circuit to adjust the observer position θobs_v by the current position offset θoffset_v to match the measured position θmeas. The rising edge of the enable signal triggers the rising edge monostable which in turn enables a determination of the voltage position offset θoffset_v. The voltage position offset θoffset_v is added to the observed position θobs_v to synchronize it the measured position °meas.

At S730, the fault detector 215 uses the observer position of the selected observer θobs plus the observed speed ωobs*Ts, where Ts is a control loop delay for calculating position, as the new control position θcont and the observer speed of the selected observer ωobs as the new control speed ωcont. Once the transition is complete, the fault detector 215 uses the observer position of the selected observer θobs as the new control position θcont and the observer speed of the selected observer ωobs as the new control speed ωcont.

At S540, the fault detector 215 may determine whether the sensor has recovered. S540 may be performed at a control rate. The control rate may also be referred to as a task rate, a step rate or an execution rate and is based on the clock rate of the controller.

Figure 8:
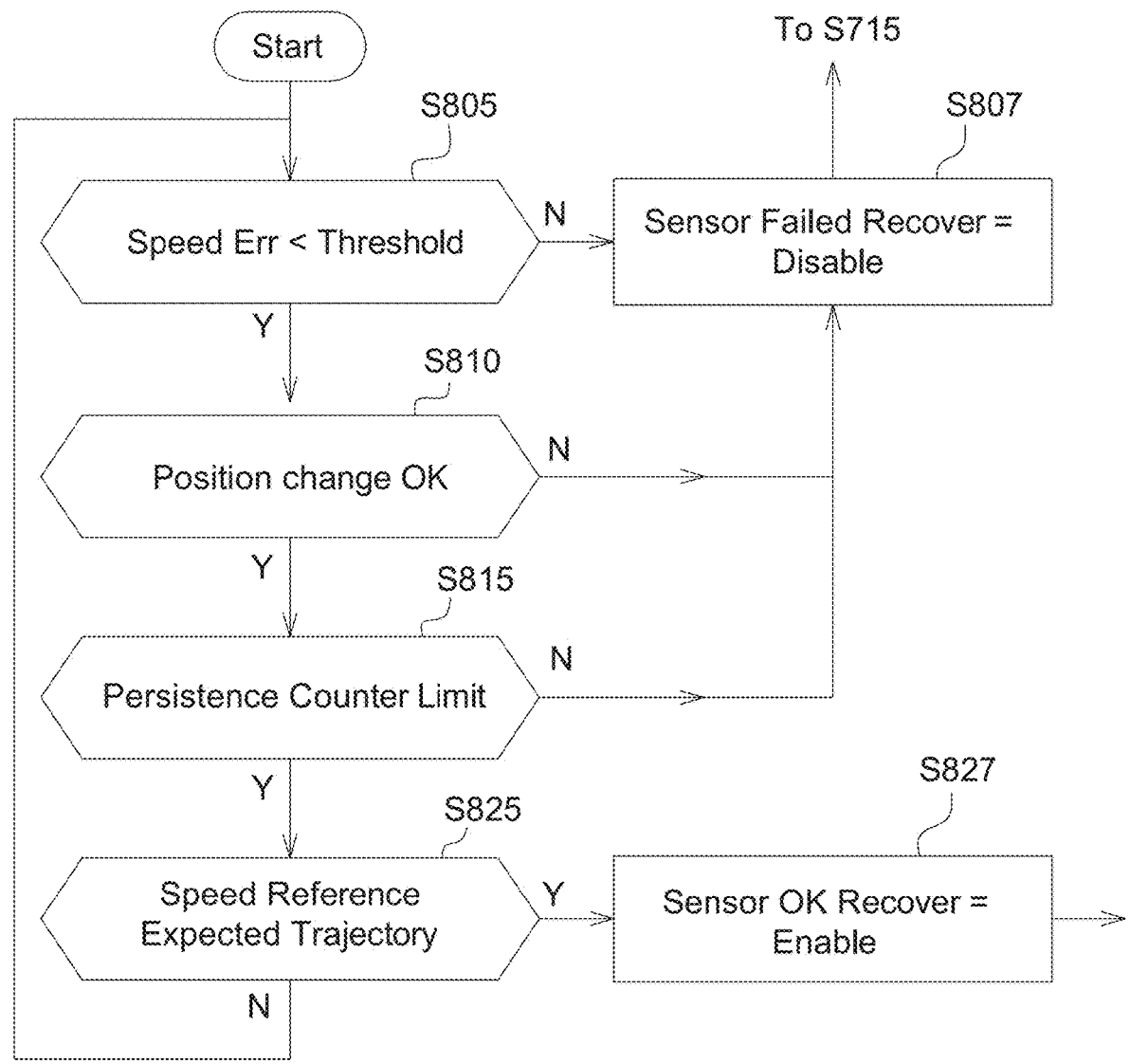

FIG. 8 illustrates method of determining whether a sensor has recovered according to an example embodiment.

At S805, the fault detector 215 determines whether a speed error is less than an error threshold. The speed error may be a difference between the command rotor speed $\omega^*_r$ and the measured speed ωmeas. If the fault detector 215 determines the speed error is equal to or more than a speed error threshold, the fault detector does not generate a falling edge for the enable signal at S807 (i.e., does not permit a switch of the control position θcont and the control speed ωcont from the observed position θobs and the observed speed ωobs to the measured position θmeas and the measured speed ωmeas). If the fault detector 215 determines the speed error is less than a speed error threshold, the method proceeds to S810.

At S810, the fault detector 215 determines whether a position change is within a range. More specifically, the fault detector determines a degrees/sec change Δω (also referred to as a position change) between the measured rotor speed ωmeas[k] using the measured position θmeas[k] and a previous measured rotor speed ωmeas[k−1] using the measured position θmeas[k−1]. If the degrees/sec change Δω calculated from the measured position θmeas is outside a desired range, the fault detector 215 does not enable generate a falling edge for the enable signal at S807.

At S815, the fault detector 215 determines whether a persistence counter limit has been reached. The persistence counter counts a number of times the speed error and position change are acceptable (yes for S805 and S810). If the counter limit has not been reached, the fault detector 215 proceeds to S807. If the counter limit has been reached, the fault detector 215 proceeds to S825.

At S825, the fault detector 215 determines whether there is a change in the speed command. If the fault detector 215 determines there is no change in the speed command, the fault detector 215 generates a falling edge for the enable signal at S827 (i.e., permits a switch of the control position θcont and the control speed ωcont from the observed position θobs and the observed speed ωobs to the measured position θmeas and the measured speed ωmeas). If the fault detector 215 determines there is a change in the speed command, the method proceeds back to S805.

If the fault detector 215 determines that sensor has not recovered, the method proceeds to S715 and referring back to FIG. 5, the fault detector 215 uses the observer position θobs as the control position θcont and the observer speed ωobs as the control speed ωcont at S535.

If the fault detector 215 determines that sensor has recovered at S540, the fault detector 215 transitions the control position θcont and the control speed ωcont from the observed position θobs and the observed speed ωobs to the measured position θmeas and the measured speed ωmeas at S545.

Figure 9:
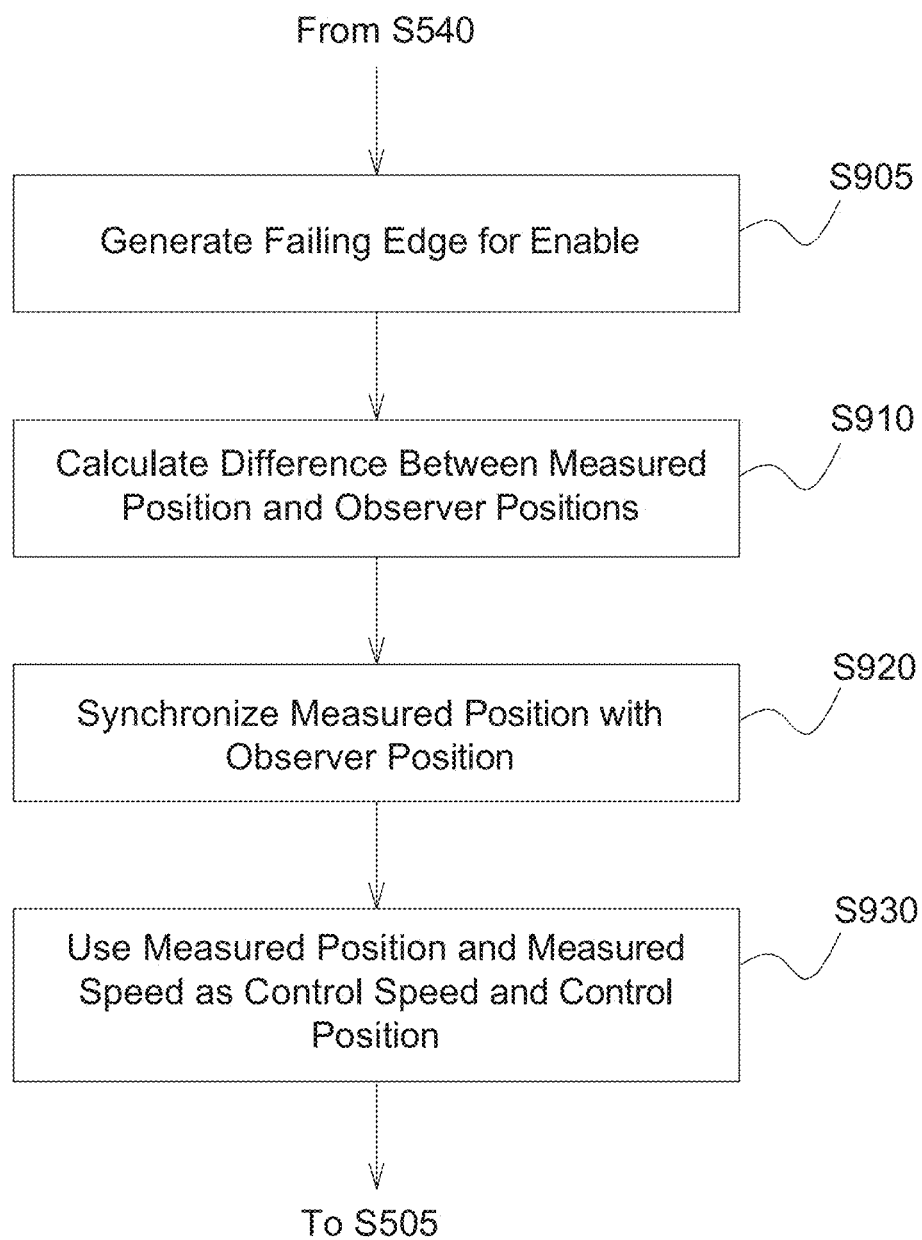

FIG. 9 illustrates an example embodiment of transitioning to the measured position and measured speed as the control position and control speed.

At S905, the fault detector 215 generates a falling edge for the enable signal when the fault detector 215 determines the sensor has recovered at S540. Upon generation of the falling edge, the fault detector determines a position offset θoffset between the control position θcont and the measured position θmeas at S910.

At S920, the fault detector 215 may synchronize the observer position θobs with the measured position °meas. More specifically, the fault detector 215 uses a monostable circuit (e.g., having a 50 µs sample time) to adjust the measured position θmeas by the position offset θoffset to match the observed position θobs. More specifically, the fault detector 215 uses the monostable circuit to adjust the measured position θmeas by the position offset θoffset to match the observed position θobs. The falling edge of the enable signal triggers a falling edge monostable which in turn enables a determination of the position offset θoffset. The position offset θoffset is added to the measured position θmeas to synchronize it the observed position θobs.

At S930, the fault detector 215 uses the measured position θmeas plus the observed speed ωobs*Ts, where Ts is a control loop delay for calculating position, as the new control position θcont and the measured speed ωmeas as the new control speed ωcont.

Figure 10:
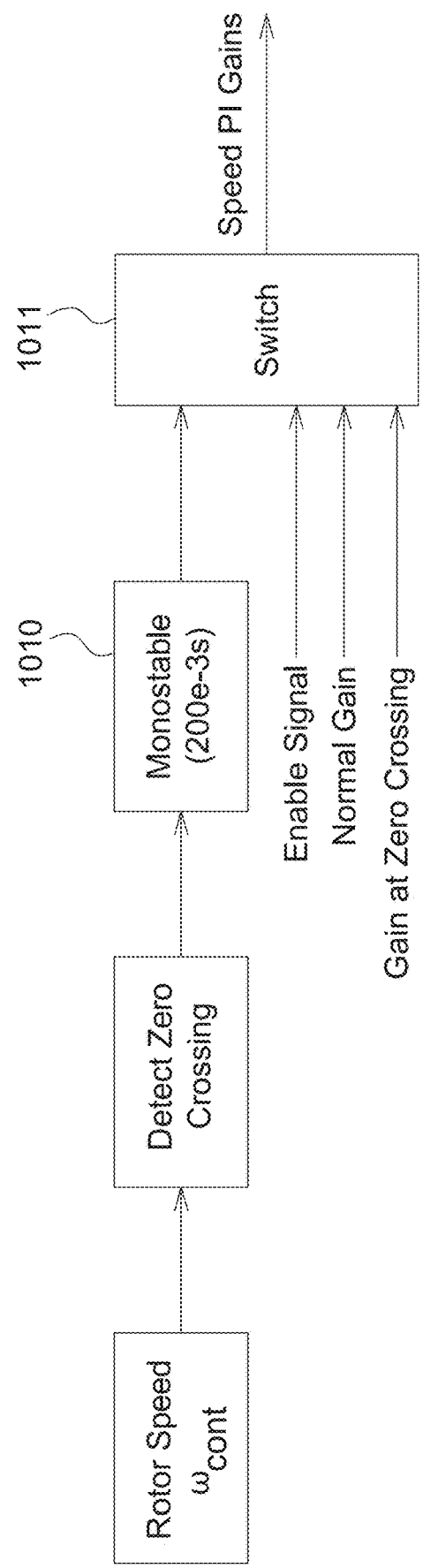

FIG. 10 illustrates a flow chart of dynamically adjusting proportional integral (PI) gains of the controller 101 according to an example embodiment. More specifically, the speed regulator 105 includes a proportional-integral-derivative (PID) controller to generate the feed forward torque value TFF. The controller 101 detects zero crossings of the control speed ωcont. Upon detection of a zero crossing a monostable circuit 1010 is triggered. The monostable circuit 1010 provides an input to a switch 1011.

The switch 1011 also receives the enable signal, a normal gain and the speed PI gains at the zero crossing. The switch 1011 dynamically lowers the PI gains to minimize transients when the enable signal is high (i.e., when and after a rising edge is generated).

At least some example embodiments provide a non-transitory computer readable medium storing instructions, when executed by a controller of a system, configured to cause the system to obtain a measured speed of an electric machine and a measured position of the electric machine based on output from a sensor, select an observer based on a speed value, obtain an estimated speed of the electric machine and an estimated position of the electric machine using the selected observer, determine a control output based on the measured speed and the measured position, the control output being the measured speed and the measured position or the estimated speed and the estimated position and control the electric machine using the control output.

In at least one example embodiment, the non-transitory computer readable medium, storing the instructions, when executed by the controller, is configured to cause the system to select a voltage model observer or a current model observer based on the speed value.

In at least one example embodiment, the non-transitory computer readable medium, storing the instructions, when executed by the controller, is configured to cause the system to select the current model observer if the speed value is below a threshold and determine the estimated position using the current model observer.

In at least one example embodiment, the non-transitory computer readable medium, storing the instructions, when executed by the controller, is configured to cause the system to select the voltage model observer if the speed value is above a threshold and determine the estimated position using the voltage model observer.

In at least one example embodiment, the non-transitory computer readable medium, storing the instructions, when executed by the controller, is configured to cause the system to determine the estimated position using the selected current model observer or the voltage model observer and determine the estimated speed using a Luenberger observer.

In at least one example embodiment, the non-transitory computer readable medium, storing the instructions, when executed by the controller, is configured to cause the system to determine a first residual based on the measured speed, determine a second residual based on the measured position and determine a control output based on the first residual and the second residual.

In at least one example embodiment, the non-transitory computer readable medium, storing the instructions, when executed by the controller, is configured to cause the system to determine a cumulative value based on a plurality of speed commands and update the first residual based on the speed commands.

In at least one example embodiment, the non-transitory computer readable medium, storing the instructions, when executed by the controller, is configured to cause the system to determine if there is a change in the measured position and maintain the second residual if there is no change in the measured position.

In at least one example embodiment, the non-transitory computer readable medium, storing the instructions, when executed by the controller, is configured to cause the system to determine whether a difference between a speed command and a filtered speed is greater than zero, determine whether the speed command is greater than zero and increment the second residual if the difference between a speed command and a filtered speed is greater than zero and the speed command is greater than zero.

At least some example embodiments provide a system including means for obtaining a measured speed of an electric machine and a measured position of the electric machine based on output from a sensor, means for selecting an observer based on a speed value, means for obtaining an estimated speed of the electric machine and an estimated position of the electric machine using the selected observer, means for determining a control output based on the measured speed and the measured position, the control output being the measured speed and the measured position or the estimated speed and the estimated position and means for controlling the electric machine using the control output.

In at least one example embodiment, the means for selecting is configured to select a voltage model observer or a current model observer based on the speed value.

In at least one example embodiment, the means for selecting is configured to select the current model observer if the speed value is below a threshold and determine the estimated position using the current model observer.

In at least one example embodiment, the means for selecting is configured to select the voltage model observer if the speed value is above a threshold and determine the estimated position using the voltage model observer.

In at least one example embodiment, the means for selecting is configured to determine the estimated position using the selected current model observer or the voltage model observer and determine the estimated speed using a Luenberger observer.

In at least one example embodiment, the means for determining is configured to determine a first residual based on the measured speed, determine a second residual based on the measured position and determine a control output based on the first residual and the second residual.

In at least one example embodiment, the means for determining is configured to determine a cumulative value based on a plurality of speed commands and update the first residual based on the speed commands.

In at least one example embodiment, the means for determining is configured to determine if there is a change in the measured position and maintain the second residual if there is no change in the measured position.

In at least one example embodiment, the means for determining is configured to determine whether a difference between a speed command and a filtered speed is greater than zero, determine whether the speed command is greater than zero, and increment the second residual if the difference between a speed command and a filtered speed is greater than zero and the speed command is greater than zero.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
a memory storing instructions; and
at least one controller configured to execute the instructions to cause the system to,
obtain a measured speed of an electric machine and a measured position of the electric machine based on output from a sensor, the electric machine being an electric motor and the sensor including an encoder or a resolver,
select an observer, where the observer comprises a voltage model observer or a current model observer, based on a threshold speed value,
obtain an estimated speed of the electric machine and an estimated position of the electric machine using the selected observer,
determine a control output based on the measured speed and the measured position, the control output being the measured speed and the measured position or the estimated speed and the estimated position, and
control the electric machine using the control output.

2. The system of claim 1, wherein the at least one controller is configured to execute the instructions to cause the system to,
select the current model observer if the measured speed is below the threshold speed value, and
determine the estimated position using the current model observer.

3. The system of claim 1, wherein the at least one controller is configured to execute the instructions to cause the system to,
select the voltage model observer if the measured speed is above the threshold speed value, and
determine the estimated position using the voltage model observer.

4. The system of claim 1, wherein the at least one controller is configured to execute the instructions to cause the system to,
determine the estimated position using the selected current model observer or the voltage model observer, and
determine the estimated speed using a Luenberger observer.

5. The system of claim 1, wherein the at least one controller is configured to execute the instructions to cause the system to,
determine a first residual based on the measured speed,
determine a second residual based on the measured position, and
determine the control output based on the first residual and the second residual.

6. The system of claim 5, wherein the at least one controller is configured to execute the instructions to cause the system to,
determine a cumulative value based on a plurality of speed commands, and
update the first residual based on the speed commands.

7. The system of claim 5, wherein the at least one controller is configured to execute the instructions to cause the system to,
determine if there is a change in the measured position, and
maintain the second residual if there is no change in the measured position.

8. The system of claim 7, wherein the at least one controller is configured to execute the instructions to cause the system to,
determine whether a difference between a speed command and a filtered speed is greater than zero,
determine whether the speed command is greater than zero, and
increment the second residual if the difference between a speed command and a filtered speed is greater than zero and the speed command is greater than zero.

9. The system of claim 1, wherein the electric machine motor is an interior permanent magnet synchronous motor.

10. The system of claim 1, wherein the at least one controller is configured to execute the instructions to cause the system to,
control the electric machine using the control output via an inverter circuit.

11. A method comprising:
obtaining a measured speed of an electric machine and a measured position of the electric machine based on output from a sensor, the electric machine being an electric motor and the sensor including an encoder or a resolver;
selecting an observer, where the observer comprises a voltage model observer or a current model observer, based on a threshold speed value;
obtaining an estimated speed of the electric machine and an estimated position of the electric machine using the selected observer;
determining a control output based on the measured speed and the measured position, the control output being the measured speed and the measured position or the estimated speed and the estimated position; and
controlling the electric machine using the control output.

12. The method of claim 11, wherein the selecting includes,
selecting the current model observer if the measured speed is below the threshold speed value, and
determining the estimated position using the current model observer.

13. The method of claim 11, wherein the selecting includes,
selecting the voltage model observer if the measured speed is above the threshold speed value, and determining the estimated position using the voltage model observer.

14. The method of claim 11, wherein the selecting includes,
    determining the estimated position using the current model observer or the voltage model observer, and
    determining the estimated speed using a Luenberger observer.

15. The method of claim 11, wherein the determining includes,
    determining a first residual based on the measured speed,
    determining a second residual based on the measured position, and
    determining the control output based on the first residual and the second residual.

16. The method of claim 15, wherein the determining the first residual includes,
    determining a cumulative value based on a plurality of speed commands, and
    updating the first residual based on the speed commands.

17. The method of claim 15, wherein the determining the second residual includes,
    determining if there is a change in the measured position, and
    maintaining the second residual if there is no change in the measured position.

18. The method of claim 17, wherein the determining the second residual includes,
    determining whether a difference between a speed command and a filtered speed is greater than zero,
    determining whether the speed command is greater than zero, and
    incrementing the second residual if the difference between a speed command and a filtered speed is greater than zero and the speed command is greater than zero.

19. A non-transitory computer readable medium storing instructions, when executed by a controller of a system, configured to cause the system to:
    obtain a measured speed of an electric machine and a measured position of the electric machine based on output from a sensor, the electric machine being an electric motor and the sensor including an encoder or a resolver;
    select an observer, where the observer comprises a voltage model observer or a current model observer, based on a threshold speed value;
    obtain an estimated speed of the electric machine and an estimated position of the electric machine using the selected observer;
    determine a control output based on the measured speed and the measured position, the control output being the measured speed and the measured position or the estimated speed and the estimated position; and
    control the electric machine using the control output.

20. The non-transitory computer readable medium of claim 19, storing the instructions, when executed by the controller, configured to cause the system to:
    select the current model observer if the measured speed is below the threshold speed value, and
    determine the estimated position using the current model observer.

21. The non-transitory computer readable medium of claim 19, storing the instructions, when executed by the controller, configured to cause the system to:
    select the voltage model observer if the measured speed is above the threshold speed value, and
    determine the estimated position using the voltage model observer.

22. The non-transitory computer readable medium of claim 19, storing the instructions, when executed by the controller, configured to cause the system to:
    determine the estimated position using the selected current model observer or the voltage model observer, and
    determine the estimated speed using a Luenberger observer.

23. The non-transitory computer readable medium of claim 19, storing the instructions, when executed by the controller, configured to cause the system to:
    determine a first residual based on the measured speed,
    determine a second residual based on the measured position, and
    determine the control output based on the first residual and the second residual.

24. The non-transitory computer readable medium of claim 23, storing the instructions, when executed by the controller, configured to cause the system to:
    determine a cumulative value based on a plurality of speed commands, and
    update the first residual based on the speed commands.

25. The non-transitory computer readable medium of claim 23, storing the instructions, when executed by the controller, configured to cause the system to:
    determine if there is a change in the measured position, and
    maintain the second residual if there is no change in the measured position.

26. The non-transitory computer readable medium of claim 25, storing the instructions, when executed by the controller, configured to cause the system to:
    determine whether a difference between a speed command and a filtered speed is greater than zero,
    determine whether the speed command is greater than zero, and
    increment the second residual if the difference between a speed command and a filtered speed is greater than zero and the speed command is greater than zero.

* * * * *